US011767132B2

(12) United States Patent
Rix et al.

(10) Patent No.: US 11,767,132 B2
(45) Date of Patent: Sep. 26, 2023

(54) SYSTEM AND METHOD FOR AIRCRAFT CONTAMINANT MONITORING AND OPERATION SCHEDULING

(71) Applicant: Satavia Ltd., Cambridge (GB)

(72) Inventors: Antony Rix, Cambridge (GB); Adam Durant, Cambridge (GB)

(73) Assignee: SATAVIA LTD., Cambridge (GB)

( * ) Notice: Subject to any disclaimer, the term of this patent is extended or adjusted under 35 U.S.C. 154(b) by 781 days.

(21) Appl. No.: 16/567,579

(22) Filed: Sep. 11, 2019

(65) Prior Publication Data
US 2020/0079532 A1 Mar. 12, 2020

(30) Foreign Application Priority Data

Sep. 11, 2018 (GB) .................................. 1814777

(51) Int. Cl.
*B64F 5/60* (2017.01)
*G06N 20/00* (2019.01)
(Continued)

(52) U.S. Cl.
CPC ................ *B64F 5/60* (2017.01); *B64D 45/00* (2013.01); *G01C 23/00* (2013.01); *G06N 20/00* (2019.01); *B64D 2045/0085* (2013.01)

(58) Field of Classification Search
CPC ... B64F 5/60; B64D 45/00; B64D 2045/0085; G01C 23/00; G06N 20/00; G06N 3/08;
(Continued)

(56) References Cited

U.S. PATENT DOCUMENTS

2017/0323274 A1 11/2017 Johnson et al.

FOREIGN PATENT DOCUMENTS

CA 3008341 A1 * 12/2018 .......... F01D 25/007
CN 102042956 A * 5/2011
(Continued)

OTHER PUBLICATIONS

Durant et al., "DEADALUS—Enhanced Weather Threat Awareness for Aviation" published in ESA Business Application on Aug. 31, 2015, 5 pages Link attached https://business.esa.int/projects/daedalus, accessed Jun. 11, 2018.
(Continued)

*Primary Examiner* — Mary Cheung
(74) *Attorney, Agent, or Firm* — Ziegler IP Law Group

(57) ABSTRACT

There is disclosed an aircraft operation scheduling system, wherein:
(a) the aircraft operation scheduling system includes a computing arrangement that computes a measure of contaminant exposure for estimating aircraft contamination, wherein the computing arrangement, when in operation, accesses a database of contamination data over location and time;
(b) the computing arrangement receives when in operation schedule information related to a plurality of aircraft flights;
(c) the computing arrangement receives aircraft data relating to an aircraft fleet being scheduled, and interrogates a database of contamination data to derive:
  (i) an estimated historical contamination for the aircraft or each aircraft engine of the aircraft to at least one contaminant; and
  (ii) an estimated expected contaminant exposure for the aircraft or each aircraft engine; and
(d) the computing arrangement, when in operation:
  (i) identifies at least one aircraft engine with a higher estimated historical contaminant exposure or with a lower estimated historical contaminant exposure;
  (ii) identifies at least one route with a lower expected exposure or a higher expected exposure to the at least one contaminant; and
(Continued)

(iii) provides recommendations on route allocation by assigning an aircraft with the higher estimated historical contaminant exposure being scheduled to at least one route with lower expected exposure to the at least one contaminant.

20 Claims, 12 Drawing Sheets

(51) Int. Cl.
  *B64D 45/00* (2006.01)
  *G01C 23/00* (2006.01)
(58) Field of Classification Search
  CPC ........ G06N 20/10; G06N 20/20; G06N 7/005; G06Q 10/0631; G06Q 10/20
  See application file for complete search history.

(56) References Cited

FOREIGN PATENT DOCUMENTS

| | | | | | |
|---|---|---|---|---|---|
| CN | 106017472 | A | * | 10/2016 | ............. G01C 21/20 |
| CN | 205982217 | U | * | 2/2017 | |
| CN | 107067824 | A | * | 8/2017 | ............. G06N 3/126 |
| CN | 107123315 | A | * | 9/2017 | |
| EP | 2562701 | A1 | | 2/2013 | |

OTHER PUBLICATIONS

Combined Search and Examination Report under Section 17 and 18(3) of GB Application No. GB1814777.7 dated Nov. 8, 2018, 8 pages.

* cited by examiner

SYSTEM AND METHOD FOR AIRCRAFT CONTAMINANT MONITORING AND OPERATION SCHEDULING

TECHNICAL FIELD

The present disclosure relates generally to systems that measure atmospheric contaminant exposure of aircraft, for example atmospheric contaminant exposure of aircraft engines, and control routes flown by the aircraft depending upon such atmospheric contaminant exposure; the routes are controlled, for example, by way of recommendation. Moreover, the present disclosure relates to methods for (of) scheduling operations of aircraft and controlling routes flown by the aircraft depending upon such atmospheric contaminant exposure; the routes are controlled, for example as aforementioned, by way of recommendation. Moreover, the aforesaid systems employ estimates of aircraft engine contaminant exposure for providing recommendation on route assignments. Furthermore, the present disclosure is concerned with computer program products comprising a non-transitory computer readable storage medium having computer-readable instructions stored thereon, the computer-readable instructions being executable by a computerized device comprising processing hardware to execute the aforesaid methods.

BACKGROUND

Environmental (atmospheric) contaminants such as dust, ice, atmospheric aerosol particles and corrosive gases pose a hazard to aircrafts. The environmental contaminants accumulate inside aircraft bodies, aircraft wings, aircraft surfaces, aircraft control apparatus, aircraft undercarriage, aircraft ducts, aircraft instruments, aircraft engines and so forth; moreover, the environmental contaminants cause wear or blockage, adhering to components thus clogging them, damaging protective surfaces, and inducing corrosion. Certain environmental contaminants potentially corrosively or abrasively attack such components. Such detrimental effects potentially damage the aircraft, systems, instruments and/or the engines of the aircrafts, thus reducing aircraft and/or aircraft engine life, and potentially even cause in-flight failures or incorrect performance or instrument readings, resulting in a cost impact and causing a potential risk to human lives. It is therefore desirable to try to avoid exposure to such environmental contamination and also remove such contamination from aircraft before damage occurs; however, such removal, for example by way of washing of aircraft component parts, costs money and physical resources, and also results in aircraft being grounded during such washing.

In aircraft flight operations, many airlines assign aircraft over routes on a basis of convenient scheduling and take no account of contaminant exposure. Such a lack of account of contaminant exposure may lead to variations in contaminant exposure building up across a fleet of aircraft, causing early aircraft engine failures or requiring excessive aircraft engine maintenance (for example aircraft engine wash-down), resulting in additional costs. One existing known system and method of evaluating detrimental effects of dust on aircraft engines involves using a database that is programmed in non-volatile memory that selects one of a flight paths between two points or a point of departure and frequency of departure in the flight path from the point for an aircraft; this existing known system is primarily concerned with rescheduling maintenance and makes only a passing reference to aircraft fleet and to contaminants other than dust. Dust and other contaminants vary greatly with time of day, time of year, and with longer-term variations such as anthropogenically-forced climate change, volcanic eruptions and major accidents (for example, the effect of the monsoon season in certain countries). Moreover, it is known that occasional high levels of contaminant exposure are potentially much more harmful to a given aircraft engine than a near-constant exposure to the same average level of a contaminant, for example a constant low level of dust is safely flushed by the given aircraft engine, but a high level of such contamination can cause irreversible clogging of the given aircraft engine. Known methods in the art are incapable of adequately taking into account changes in weather or contaminant distribution that occur after programming.

Therefore, in light of the foregoing discussion, there exists a need to address, for example to overcome, the aforementioned drawbacks in existing known approaches for scheduling aircraft operations based on real-time estimates of environmental contamination exposure of aircraft engines.

Embodiments of the present disclosure substantially eliminate, or at least partially address, the aforementioned drawbacks in existing known approaches for scheduling aircraft operations based on real-time estimates of environmental contamination exposure of aircraft engines.

SUMMARY

The present disclosure seeks to provide an improved system that, when in operation, schedules aircraft operations based on real-time estimates of environmental contamination exposure of aircraft engines.

According to a first aspect, there is provided an aircraft operation scheduling system comprising:
(a) a computing arrangement that computes a measure of contaminant exposure for estimating aircraft contamination, wherein the computing arrangement, when in operation, accesses a database of contamination data as a function of spatial location and time;
(b) the computing arrangement receives when in operation schedule information related to a plurality of aircraft flights;
(c) the computing arrangement receives aircraft data relating to an aircraft fleet being scheduled; and interrogates a database of contamination data to derive:
  (i) an estimated historic contamination for the aircraft or each aircraft engine of the aircraft to at least one contaminant; and
  (ii) an estimated expected contaminant exposure for the aircraft or each aircraft engine; and
(d) the computing arrangement, when in operation:
  (i) identifies at least one aircraft engine with higher estimated historical contaminant exposure or with lower estimated historical contaminant exposure;
  (ii) identifies at least one route with lower expected exposure or highest expected exposure to the at least one contaminant; and
  (iii) provides recommendations on route allocation by assigning an aircraft with the higher estimated historical contaminant exposure being scheduled to at least one route with lower expected exposure to the at least one contaminant.

The invention is of advantage in that improved scheduling operations for aircraft engines can assist to improve aircraft engine reliability and operating longevity. Moreover, by employing the computing arrangement, the aircraft operation scheduling system is capable of implementing data fusion, wherein a broader spectrum of sources of information can be accommodated by the system; there is thereby achieved more accurate prediction results and recommended routes based on contaminant exposure experienced by a given aircraft. For example, the expected contaminant exposure is beneficially calculated from the database of contaminant data and the expected contaminant exposure calculated from an exposure index, for example in real-time, wherein the contaminant data and the expected contaminant exposure are combined, aggregated or merged to generate more accurate predictions.

Optionally, in the aircraft operation scheduling system, the computing arrangement provides recommendations on route allocation to ensure that a total exposure to contamination, based upon the estimated historical contaminant exposure and expected contaminant exposure, is reduced or maintained within a required range.

Optionally, in the aircraft operation scheduling system, the computing arrangement employs machine learning utilizing one or more adaptive algorithms, wherein the one or more adaptive algorithms are trained using historical data pertaining to one or more aircraft or one or more aircraft engines.

Optionally, in the aircraft operation scheduling system, at least one contaminant exposure is determined using a statistical or machine learning model applied to values of a contaminant determined from at least one of: a database, a web API, a NWP model, a measurement Optionally, in the aircraft operation scheduling system, at least one contaminant exposure is determined using a statistical or machine learning model arranged to compensate for bias or spatial or temporal uncertainty in values of a contaminant determined from at least one of: a database, a web API, a NWP model, a measurement Optionally, in the aircraft operation scheduling system, a measure of spatial or temporal uncertainty is determined using a statistical or machine learning model arranged to receive values of a contaminant determined from at least one of: a database, a web API, a NWP model, a measurement.

Optionally, in the aircraft operation scheduling system, the computing arrangement includes:
  a control module comprising:
    a processor; and
    a memory, containing the executable instructions for calculating the measure of contaminant exposure to estimate aircraft engine contamination; and
    the at least one storage medium coupled directly or indirectly to the control module and containing the database of contamination data as a function of spatial location and time;
  a route input interface that receives, when in operation, schedule information related to a plurality of aircraft flights;
  a fleet input interface that receives the aircraft flight data and aircraft engine data relating to the aircraft fleet being scheduled; and wherein the control module receives the schedule information from the route input interface and the aircraft flight data and the aircraft engine data from the fleet input interface; and the processor interrogates the database of contamination data to derive:
    the estimated historic contamination for the aircraft or each aircraft engine to at least one contaminant; and
    the estimated expected contaminant exposure for the aircraft or each aircraft engine; and
  the control module further
    identifies at least one aircraft engine with higher estimated historical contaminant exposure or with lower estimated historical contaminant exposure;
    identifies at least one route with lower expected exposure or highest expected exposure to the at least one contaminant; and
    provides recommendations on route allocation by assigning the aircraft with the higher estimated historical contaminant exposure being scheduled to at least one route with lower expected exposure to the at least one contaminant to ensure that total exposure to contamination, based upon the estimated historical contaminant exposure and expected contaminant exposure, is reduced or maintained within a required range;
  the system further comprising the output interface that receives recommended route allocation information from the control module.

Optionally, in the aircraft operation scheduling system, the processor preferentially assigns aircraft with lower estimated historical contaminant exposure to routes with higher expected exposure to the at least one contaminant during route allocation.

Optionally, in the aircraft operation scheduling system, the system comprises an input interface that receives further input variables to be utilized by the processor to calculate a measure of contaminant exposure to estimate aircraft engine contamination, wherein the input variables include at least one of engine or aircraft control, loading or operational parameters, engine or aircraft model and type information, sensor data, weather parameters, temperatures, speeds, altitudes, mass flow rates, fuel flow rates, vibration measures, inspection results or wear estimates.

Optionally, in the aircraft operation scheduling system, the system comprises a distributed computing system, wherein the control module and at least one data storage medium are centralized and the fleet input interface, the schedule input interface, and the output interface are provided at one or more local computing nodes.

Optionally, in the aircraft operation scheduling system, the expected contaminant exposure of the aircraft or the aircraft engine is estimated by determining an exposure index which is a measure of a contaminant exposure or an amount of contaminant material that passes through the aircraft or the aircraft engine in the aircraft fleet based on its trajectory, wherein the control module allocates the exposure index to each aircraft engine in the fleet based upon the estimated historical contamination.

More optionally, in the aircraft operation scheduling system, the amount of the contaminant material that passes through the aircraft or aircraft engine is calculated based on the mass flow rate and the fuel flow rate.

Optionally, in the aircraft operation scheduling system, the processor performs, when in operation, the recommendation on route allocation by optimizing to reduce a variation in the exposure index across a plurality of aircraft in the fleet over time.

Optionally, in the aircraft operation scheduling system, the system further comprises a maintenance interface, wherein the maintenance interface is coupled in communication with the control module to input data for adjusting the estimated historical contamination for the aircraft or each aircraft engine as a result of maintenance interventions and to output alerts for required interventions.

Optionally, in the aircraft operation scheduling system, the historical contamination of the aircraft is estimated by determining at least one of an average contamination exposure of the aircraft or each aircraft engine per cycle, an average contamination exposure of the aircraft or each aircraft engine per time interval or a cumulative contamination exposure of the aircraft or each aircraft engine and determining historical contamination of at least one flight phase of the aircraft or each aircraft engine from the database of contamination data.

According to a second aspect, there is provided a method for (of) scheduling aircraft operations, wherein the method comprises:

(a) calculating, using a computing arrangement, a measure of contaminant exposure to estimate aircraft contamination based upon known historical data sets including aircraft flight data, atmospheric contaminant data over location and time, and engine service data;

(b) using the measure of contaminant exposure to calculate an estimate of the historical contamination of the aircraft or engines of the aircraft being scheduled;

(c) using the measure of contaminant exposure to estimate an expected exposure to at least one contaminant basis for a plurality of required aircraft flights;

(d) identifying at least one aircraft or aircraft engine with higher estimated historical contaminant exposure or with lower estimated historical contaminant exposure;

(e) identifying at least one route with lower expected exposure or highest expected exposure to the at least one contaminant; and (f) providing recommendations on a route allocation by assigning an aircraft or aircraft engine with the higher estimated historical contaminant exposure being scheduled to at least one route with lower expected exposure to the at least one contaminant.

The invention is of advantage in that the method of scheduling aircraft operations is capable of providing improved scheduling operations for aircraft engines that assist to improve aircraft engine reliability and operating longevity. Moreover, by employing the computing arrangement, the method is capable of implementing data fusion, wherein a broader spectrum of sources of information can be accommodated by the method; there is thereby achieved more accurate prediction results and recommended routes based on contaminant exposure experienced by a given aircraft. For example, the expected contaminant exposure is beneficially calculated from the database of contaminant data and the expected contaminant exposure calculated from an exposure index, for example in real-time, wherein the contaminant data and the expected contaminant exposure are combined, aggregated or merged to generate more accurate predictions.

Optionally, the method includes in step (f) providing recommendations on a route allocation to ensure that total exposure to contamination, based upon the estimated historical contaminant exposure and expected contaminant exposure, is reduced or maintained within a required range.

Optionally, in the method, the measure of contaminant exposure for estimating aircraft engine contamination is trained using historical data sets and machine learning, and used thereafter to provide recommendations.

Optionally, in the method, at least one contaminant exposure is determined using a statistical or machine learning model applied to values of a contaminant determined from at least one of: a database, a web API, a NWP model, a measurement Optionally, in the method, at least one contaminant exposure is determined using a statistical or machine learning model arranged to compensate for bias or spatial or temporal uncertainty in values of a contaminant determined from at least one of: a database, a web API, a NWP model, a measurement Optionally, in the method, a measure of spatial or temporal uncertainty is determined using a statistical or machine learning model arranged to receive values of a contaminant determined from at least one of: a database, a web API, a NWP model, a measurement Optionally, in the method, the step of using the measure of contaminant exposure to calculate an estimate of the historic exposure of the engines of an aircraft being scheduled to atmospheric contamination is performed on a plurality of aircraft and the route allocation comprises preferential assignment of aircraft with lower estimated historical contaminant exposure to routes with higher expected exposure to the at least one contaminant to reduce an expected deviation between the aircraft with higher estimated historical contaminant exposure and the aircraft with lower estimated historical contaminant exposure.

Optionally, the method further comprises categorizing aircraft flights into groups based upon the estimated exposure to the at least one contaminant, when providing the recommendations on a route allocation.

Optionally, the method further comprises categorizing the aircraft into groups based upon the estimated historical contamination of engines, when providing the recommendations on a route allocation.

Optionally, in the method, the measure of contaminant exposure incorporates a plurality of contaminant types and wherein the route allocation applies a weighting to each contaminant type when assigning the aircraft.

More optionally, in the method, the plurality of contaminant types include at least one of different contaminants or different categories of particle size.

Optionally, in the method, the atmospheric contaminant data as a function of spatial location and time comprises an atmospheric model of at least one of the concentration or mixing ratio of contaminants at a plurality of locations and times.

More optionally, in the method, the atmospheric model provides at least one of an estimated average or a standard deviation of contaminants for each spatial location by at least one of: a time-of-day, a time-of-year.

Optionally, in the method, the atmospheric contaminants include a plurality of contaminants selected from a group comprising dust, organic particles, volcanic ash, salt, sulphur dioxide and sulphate ions.

Optionally, in the method, the atmospheric model provides at least one of: an expected mass of the respective contaminant per unit mass of air at a particular location, a height measure, and time.

Optionally, in the method, the aircraft flight data comprises flight phase and estimation of at least one of airspeed or engine mass flow and associated location, time and date information, wherein at least one of the airspeed or engine mass flow are estimated to weight the at least one contaminant to provide estimates of rate, density or mass of contaminants passing through the aircraft engine.

Optionally, in the method, the measure of contaminant exposure includes one or more further input variables selected from a group comprising: engine or aircraft control, loading or operational parameters, engine or aircraft model and type information, sensor data, weather parameters, temperatures, speeds, altitudes, mass flow rates, fuel flow rates, vibration measures, inspection results or wear estimates.

Optionally, in the method, the required aircraft flights include at least one of a plurality of geographical routes or a plurality of flight times.

Optionally, the method further comprising at least one of:
(i) determining at least one of a predictive engine health, remaining useful life of a target aircraft, based on continuation of a current operating service plan, wherein the engine health and remaining useful life of the target aircraft engine is determined based upon historic data sets including at least one of target aircraft engine flight history and the contaminant information over location and time;
(ii) determining at least one of a predictive engine health, remaining useful life, based on adoption of recommended changes to service;
(iii) adjusting one or more quantities indicative of engine health based on maintenance events;
(iv) determining at least one of a predictive engine health, remaining useful life resulting from interventions;
(v) prioritizing changes to aircraft flights to maximize an overall life of a fleet of engines;
(vi) prioritizing changes to aircraft flights to optimize the timing of expected future maintenance events; and
(vii) calculating at least one estimate of uncertainty in the prediction of at least one of engine health, remaining useful life of the target aircraft.

Optionally, in the method, the historical contamination of the aircraft or the aircraft engine being scheduled is estimated by:
(i) determining an exposure index based on a trajectory of the aircraft or the aircraft engine, wherein the exposure index is a total contaminant exposure of the aircraft or the aircraft engine, an estimated time when the aircraft or the aircraft engine has been exposed to a contaminant level above a threshold range, an average exposure per cycle, or an estimate of the remaining useful life of the engine before the next maintenance taking into account of at least one environmental contaminant exposure measure; and
(ii) determining an average weighted exposure for the aircraft or the aircraft engine to a number of contaminants based on the exposure index on a flight by flight basis and by accumulating from the engine's last major maintenance, and further dividing by a number of cycles since the major maintenance.

In other words, in respect of the method, optionally, an "exposure measure" is a measure of an average exposure (optionally normalized per cycle) to a contaminant exposure metric of each aircraft or aircraft engine, determined from historical data. Moreover, in the method, a "contaminant exposure metric" is, of example, an estimate of a total exposure of that aircraft or aircraft engine obtained by integrating contaminant density as a function of a flight trajectory; optionally, a "contaminant exposure metric" is beneficially calculated in the method by weighting a contaminant density in proportion to a mass flow of the engine in proximity to a waypoint, an altitude or a phase of a flight cycle.

Optionally, in the method, a "contaminant exposure metric" is determined from an estimated time where the contaminant is predicted to be above a pre-determined threshold. For example, the "contaminant exposure metric" is determined in the method by querying a database for obtaining an average or expected value of contaminant exposure for a particular flight cycle between respective takeoff and landing airports during a period of time. A period of time employed is optionally a day, week, month, quarter, season or year. In order to take into account seasonality, in the method, a period of time is optionally related to a week of a year, a month of a year, quarter of a year or season.

When implementing the method, the system starts by calculating an "accumulated exposure measure" from zero at a starting point in a service history corresponding to a major maintenance event. Beneficially, a given engine's last major maintenance is a shop visit, an overhaul or an engine wash. For each flight cycle after this starting point, the "accumulated exposure measure" is incremented by the "contaminant exposure metric" for that flight cycle.

The "exposure measure" is optionally the "accumulated exposure measure", in example embodiments of the present disclosure. Alternatively, the "exposure measure" is optionally beneficially an estimate of the average contaminant exposure metric per cycle, calculated by dividing the accumulated exposure measure by the number of cycles since the starting point for that aircraft or aircraft engine (that is, the major maintenance event). Optionally, the "accumulated exposure measure" is beneficially reset at each major maintenance event of a given aircraft or aircraft engine. When performing computations in embodiments of the present disclosure. Optionally, multiple contaminant metrics are computed in the method for two or more types of contaminants that potentially encountered during a flight, for example dust particles, salt particles, volcanic ash, and so forth.

Optionally, when considering a possible change to the schedule of two or more aircraft of a fleet, the method described above is performed using historical data (that is, using "contaminant exposure metric" values determined for flights in the past) to determine a current "exposure measure" for each aircraft involved. This is indicative of whether or not an aircraft has been exposed to contaminant levels that are below or above a target level or one or more typical levels for that fleet of aircraft.

Beneficially, aircraft of the fleet of aircraft are then assigned to routes in pairs, so that a first aircraft of the fleet with a first value of exposure measure is assigned preferentially to a first route or set of routes that are associated with a first value of expected exposure, and a second aircraft of the fleet with a second value of exposure measure is assigned preferentially to a second route or set of routes that are associated with a second value of expected exposure, wherein:
(i) the first value of exposure measure is larger than the second value of exposure measure; and
(ii) the first value of expected exposure is smaller than the second value of expected exposure.

The expected exposure is an estimate of the "contaminant exposure metric" that is extrapolated for future flights. Optionally, the expected exposure is derived from values obtained from historical flights, for example by way of extrapolation or modelling. For example, the expected exposure is an average of historical values over a temporal period, for example during a past year. Optionally, the expected exposure is averaged in respect of a temporal period that is shorter than a year to take into account seasons, for example a week of a year, a month of a year, a quarter of a year or a season of a year. Yet more beneficially, the expected exposure is estimated using machine learning, as will be described in greater detail below.

The method is of advantage in that such computations as described in the foregoing have a beneficial effect of helping to average values of contaminant exposure to converge across a fleet as a function of time, thereby achieving improved recommendations in view of stochastic noise in measurements being encountered. Such advantages also enables all engines to be operated to achieve close to their expected life span, and makes best use of overall engine life given that engine life is potentially limited by other factors, such as wear limits.

In the method, aircraft engines with excessive levels of contaminant exposure (given their number of cycles) are more likely to fail in service or require unscheduled inspection or maintenance, events associated with excessive costs; recommendation and predictions provided by the method helps to avoid this more likely risk of failure.

Optionally, in the method, the "exposure measure" is determined from an estimate of a given engine's condition (for example, its engine health index, its "state-of-health", its condition or its remaining useful life) taking into account its contaminant exposure and optionally sensor measurements, flight details ad so forth. Optionally, in the method, a temporal trend or "direction" of increased damage is taken into account, taking into account that above-average contaminant exposure will lead to an engine having a lower-than-expected remaining useful life (RUL), and requiring the engine to be exposed subsequently to lower-than-average contaminant exposure if it is desired that all engines should achieve close to the same expected life. In this embodiment, a process of assignment similar to that described above is performed, except that an aircraft or aircraft engine having an engine health index, engine condition or engine RUL below what would be expected (given its elapsed cycles since major maintenance) is allocated the more benign route or set of routes, and vice versa.

Optionally, the method includes,
identifying at least one route with the above average or below average exposure to the at least one contaminant;
identifying at least one aircraft or aircraft engine with above average or below average exposure to the at least one contaminant; and
assigning the at least one aircraft or aircraft engine with the above average exposure to the at least one route with the below average exposure.

According to a third aspect, there is provided a computer program product comprising instructions to cause the system of the first aspect to carry out the method of the second aspect.

Embodiments of the present disclosure substantially eliminate, or at least partially address, the aforementioned drawbacks in known existing approaches for scheduling aircraft operations based on estimates of atmospheric contamination exposure of aircraft, for example aircraft engines.

Additional aspects, advantages, features and objects of the present disclosure are made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
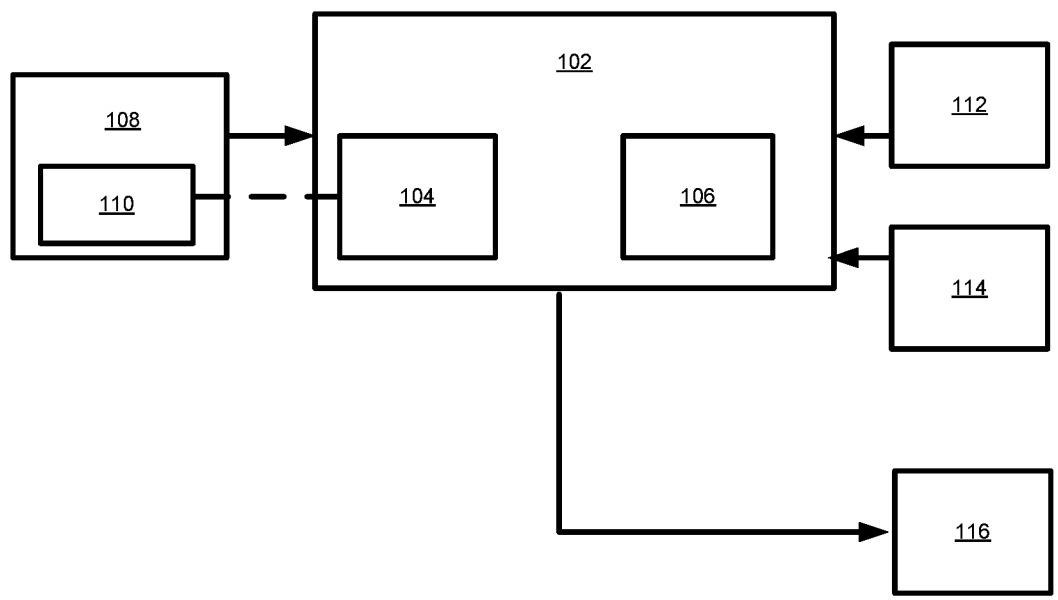
FIG. 1 is a schematic illustration of a system according to an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

According to a first aspect, there is provided an aircraft operation scheduling system, wherein the system comprises: (a) a computing arrangement that computes a measure of contaminant exposure for estimating aircraft contamination, wherein the computing arrangement, when in operation, accesses a database of contamination data as a function of spatial location and time;
(b) the computing arrangement receives when in operation schedule information related to a plurality of aircraft flights;
(c) the computing arrangement receives aircraft data relating to an aircraft fleet being scheduled, and interrogates a database of contamination data to derive:
 (i) an estimated historical contamination for the aircraft or each aircraft engine of the aircraft to at least one contaminant; and
 (ii) an estimated expected contaminant exposure for the aircraft or each aircraft engine; and
(d) the computing arrangement, when in operation:
 (i) identifies at least one aircraft engine with higher estimated historical contaminant exposure or with lower estimated historical contaminant exposure;
 (ii) identifies at least one route with lower expected exposure or higher expected exposure to the at least one contaminant; and
 (iii) provides recommendations on route allocation by assigning an aircraft with the higher estimated historical contaminant exposure being scheduled to at least one route with lower expected exposure to the at least one contaminant.

Optionally, in the aircraft operation scheduling system, the computing arrangement provides recommendations on route allocation to ensure that a total exposure to contamination, based upon the estimated historical contaminant exposure and expected contaminant exposure, is reduced or maintained within a required range.

The invention is of advantage that it helps to schedule aircraft operations by estimating expected contaminant exposure for the aircraft or aircraft engine. The present system helps to schedule aircraft operations based on the estimation of contamination exposure, which have an impact on the cost of operating the aircraft engines. The present system adjusts the service of aircraft engines to increase overall engine cycles between shop visits. By using the system, it is feasible to reduce an engine vendor's or owner's maintenance costs, and use of materials, and motivate them to adopt this practice. The present system optionally associates a fee, charge or contractual payment to estimate an expected exposure to atmospheric contaminants or to provide recommendations derived based on the estimated expected atmospheric contamination exposure, or both.

Hardware components employed to implement the system optionally include a control module containing a processor, a memory and a storage medium containing the database are associated with the centralized cloud-based system. In an embodiment, the aforesaid hardware components are associated with a server, and a route input interface, a fleet input interface and an output interface are associated with a client side of the server. The cloud-based server is optionally a tablet computer, a desktop computer, a personal computer or an electronic notebook. The components of the system are in mutual communication via a network that is optionally a wired network or a wireless network, or both.

According to an embodiment, the processor optionally assigns aircraft with lower estimated historical contaminant exposure to routes with higher expected exposure to the at least one contaminant during route allocation.

According to another embodiment, the input interface of the system receives further input variables to be utilized by the processor to calculate a measure of contamination exposure for estimating aircraft contamination, for example aircraft engine contamination, wherein the input variables include at least one of: engine or aircraft control, loading or operational parameters, engine or aircraft model and type information, sensor data, weather parameters, temperatures, speeds, altitudes, mass flow rates, fuel flow rates, vibration measures, inspection results or wear estimates.

According to yet another embodiment, the system comprises a distributed computing system, wherein the control module and at least one data storage medium are centralized, and the fleet input interface, the schedule input interface, and the output interface are provided at one or more local computing nodes.

According to yet another embodiment, the expected atmospheric contaminant exposure of the aircraft or the aircraft engine is estimated by determining an exposure index which is a measure of a contaminant exposure or an amount of contaminant material that passes through the aircraft or the aircraft engine in the aircraft fleet based on its trajectory, wherein the control module allocates the exposure index to each aircraft engine in the fleet based upon the estimated historical contamination. In an embodiment, the exposure index is optionally adjusted to account for maintenance events such as engine washes.

According to yet another embodiment, the amount of the contaminant material that passes through the aircraft or aircraft engine is calculated based on the mass flow rate and the fuel flow rate.

According to yet another embodiment, the processor performs when in operation the recommendation on route allocation by optimizing to reduce variation in the exposure index across a plurality of aircraft in the fleet as a function of time.

According to yet another embodiment, the system further comprises a maintenance interface, wherein the maintenance interface is in communication with the control module to input data to adjust the estimated historical contamination for the aircraft or each aircraft engine as a result of maintenance interventions and to output alerts for required interventions.

According to yet another embodiment, the historical contamination of the aircraft is estimated by determining at least one of an average contamination exposure of the aircraft or each aircraft engine per cycle, an average contamination exposure of the aircraft or each aircraft engine per time interval or a cumulative contamination exposure of the aircraft or each aircraft engine and determining historical contamination of at least one flight phase of the aircraft or each aircraft engine from the database of contamination data.

According to a second aspect, the present disclosure relates to a method for (of) scheduling aircraft operations, wherein the method comprises:
 (a) calculating, using a computing arrangement, a measure of contaminant exposure for estimating aircraft contamination based upon known historical data sets including aircraft flight data, atmospheric contaminant data as a function of spatial location and time, and engine service data;
 (b) using the measure of contaminant exposure to calculate an estimate of the historical contamination of the aircraft or engines of the aircraft being scheduled;

(c) using the measure of contaminant exposure to estimate an expected exposure to at least one contaminant basis for a plurality of required aircraft flights;

(d) identifying at least one aircraft or aircraft engine with higher estimated historical contaminant exposure or with lower estimated historical contaminant exposure;

(e) identifying at least one route with lower expected exposure or higher expected exposure to the at least one contaminant; and (f) providing recommendations on a route allocation by assigning an aircraft or aircraft engine with the higher estimated historical contaminant exposure being scheduled to at least one route with lower expected exposure to the at least one contaminant.

It will be appreciated that the aforesaid present method is not merely a "method of doing a mental act", but also has technical effect in that the method functions as a form of technical control using machine learning of a technical artificially intelligent system. The method involves scheduling aircraft operation based on the estimates of atmospheric contaminants exposure that and providing recommendations for route assignments to prolong the life of aircraft engines and to reduce maintenance costs and use of associated materials.

In the present disclosure, "machine learning" (ML) relates to adaptive algorithms that are capable of reconfiguring themselves depending on teaching data provided to configure the algorithms. Such adaptive algorithms are beneficially implemented as one or more software products that are executable on computing hardware. Optionally, the adaptive algorithms include explicit functions such as correlation functions, data comparison functions based on adaptive neural networks, as well as multi-dimensional solution spaces whose states are capable of being dynamically adjusted in response to receiving teaching data.

According to an embodiment, the measure of atmospheric contaminant exposure for estimating aircraft contamination, for example aircraft engine contamination, is trained, for example a priori, using historical data sets and machine learning.

According to another embodiment, the aircraft operation scheduling system optionally determines historical contaminant exposure by analyzing a plurality of historical trajectories of a plurality of aircrafts or aircraft engines associated to the set of training data as a function of spatial location and time and estimating contaminant concentration of the plurality of aircraft or aircraft engines for each trajectory using atmospheric model. In an embodiment, the contaminant exposure is optionally estimated using a trajectory or a trajectory model.

Beneficially, machine learning employing one or more adaptive algorithms are employed when implementing embodiments of the present disclosure. However, the one or more adaptive algorithms require, in order to function, a training data set that is, for example, created by processing a set of take-off and landing airport pairs, and associated dates or times of year, for flights representative of an airline's fleet (for example, by taking a sample of that airline's previous schedule). Alternatively, a sample of most common pairs of airports and a range of times is optionally selected to provide a data set applicable to multiple airlines, to provide suitable training data.

When employing the one or more adaptive algorithms, for each flight in the training data set, the "contaminant exposure metric" is determined as described above. This forms the training target, namely the value that it is desired to predict. Moreover, for each flight, features are beneficially assembled that represent airports, for example the airports' contaminant levels, locations, or encodings representative of different airports as known in the art of machine learning.

In the method, when employing machine learning, for each flight, features are beneficially assembled that represent time, for example a date and time, a nearest whole date, a week, a month or a year, a week of a year, a month of a year, a quarter or a season. A machine learning model known in the art is then trained to use the features to predict the target.

Now, in the method, when considering other aircraft, the "contaminant exposure metric" for a flight is susceptible to being estimated using the output of the machine learning model for the respective features. This estimation is beneficially executed both for historical flights (when accumulating the current exposure) and a future route or set of routes (when determining the evolution of exposure of an aircraft assigned to the flights in that route or set of routes).

According to yet another embodiment, the aircraft operation scheduling system optionally determines at least one of: an average contaminant exposure, a total and cumulative estimate of exposure to each contaminant type, per cycle and/or per time interval, and incorporates one or more of these estimates in the predictive engine health model. The aircraft engine maintenance system beneficially determines estimates of contaminant exposure as a function of at least one flight phase and incorporates the estimate for at least one flight phase in the predictive engine health model. The system optionally determines values for aggregates of types of contaminant, for example totaling dust of different particle sizes, with an optional weighting of different parameters.

The aircraft operation scheduling system optionally estimates an expected contaminant exposure of the aircraft engine for a duration of a given period of time by estimating a probability, a probability density function, or multiple parameters including expected mean and standard deviations of estimated contaminant exposure. The system optionally determines either of, or both of, the mean and standard deviation of the expected contaminant exposure or density for at least one of a time within a year and a time-of-day. For example, the historical data sets are grouped by calendar month and hour of the day, thus providing an estimate of the mean and standard deviation of an engine health parameter that varies from month to month, and over the course of a day.

According to another embodiment, the step of using the measure of contaminant exposure to calculate an estimate of the historical exposure of the engines of an aircraft being scheduled to atmospheric contamination is performed on a plurality of aircraft and the route allocation comprises preferential assignment of aircraft with lower estimated historical contaminant exposure to routes with higher expected exposure to the at least one contaminant to reduce an expected deviation between the aircraft with higher estimated historical contaminant exposure and the aircraft with lower estimated historical contaminant exposure.

According to yet another embodiment, the method further comprises categorizing aircraft flights into groups based upon the estimated exposure to the at least one contaminant, when providing the recommendations on a route allocation.

According to yet another embodiment, the method further comprises categorizing the aircraft into groups based upon the estimated historic contamination of engines, when providing the recommendations on a route allocation.

According to yet another embodiment, the measure of contaminant exposure incorporates a plurality of contaminant types and wherein the route allocation applies a weighting to each contaminant type when assigning the aircraft.

According to yet another embodiment, the plurality of contaminant types include at least one of different contaminants or different categories of particle size.

According to yet another embodiment, the atmospheric contaminant data as a function of spatial location and time comprises an atmospheric model of at least one of the concentration or mixing ratio of contaminants at a plurality of locations and times.

According to yet another embodiment, the atmospheric model provides at least one of an estimated average and a standard deviation of contaminants for each location by at least one of: a time-of-day, a time-of-year.

According to yet another embodiment, the contaminants include a plurality of contaminants selected from a group comprising: dust, organic particles, volcanic ash, salt, sulphur dioxide and sulphate ions.

According to yet another embodiment, the atmospheric model provides an expected mass of the respective contaminant per unit mass of air at a particular location, height measure, and time.

According to yet another embodiment, the aircraft flight data comprises flight phase and estimation of at least one of airspeed or engine mass flow and associated location, time and date information, wherein at least one of the airspeed or engine mass flow are estimated to weight the at least one contaminant to provide estimates of rate, density or mass of contaminants passing through the aircraft engine.

According to yet another embodiment, the measure of contaminant exposure includes one or more further input variables selected from a group comprising: engine or aircraft control, loading or operational parameters, engine or aircraft model and type information, sensor data, weather parameters, temperatures, speeds, altitudes, mass flow rates, fuel flow rates, vibration measures, inspection results or wear estimates.

According to yet another embodiment, the required aircraft flights include at least one of a plurality of geographical routes or a plurality of flight times.

According to yet another embodiment, the method further comprises at least one of:
(i) determining at least one of a predictive engine health, remaining useful life of a target aircraft, based on continuation of a current operating service plan, wherein the engine health and remaining useful life of the target aircraft engine is determined based upon historical data sets including at least one of target aircraft engine flight history and the contaminant information over location and time;
(ii) determining at least one of a predictive engine health, remaining useful life, based on the adoption of recommended changes to service;
(iii) adjusting one or more quantities indicative of engine health based on maintenance events;
(iv) determining at least one of a predictive engine health, remaining useful life resulting from interventions;
(v) prioritizing changes to aircraft flights to maximize an overall life of a fleet of engines; and
(vi) prioritizing changes to aircraft flights to optimize the timing of expected future maintenance events.

According to yet another embodiment, the historic contamination of the aircraft or the aircraft engine being scheduled is estimated by:
(i) determining an exposure index based on a trajectory of the aircraft or the aircraft engine, wherein the exposure index is a total contaminant exposure of the aircraft or the aircraft engine, an estimated time when the aircraft or the aircraft engine has been exposed to a contaminant level above a threshold range, an average exposure per cycle, or an estimate of the remaining useful life of the engine before the next maintenance taking into account of at least one environmental contaminant exposure measure; and
(ii) determining an average weighted exposure for the aircraft or the aircraft engine to a number of contaminants based on the exposure index on a flight by flight basis and by accumulating from the engine's last major maintenance, and further dividing by a number of cycles since the major maintenance.

According to yet another embodiment, the method includes:
(i) identifying at least one route with the above average or below average exposure to the at least one contaminant;
(ii) identifying at least one aircraft or aircraft engine with above average or below average exposure to the at least one contaminant; and
(iii) assigning the at least one aircraft or aircraft engine with the above average exposure to the at least one route with the below average exposure.

In an embodiment, the aircraft engines are swapped between two aircrafts, routes or flights, so that the at least one aircraft engine with above average exposure is able to have a period of below average exposure, and the at least one engine with below average exposure is able to have a period of above average exposure.

In another embodiment, the historical or forecast future exposure, or both, to contaminants associated with a particular airport, routes or flights are determinable to be associated with above or below average exposure to contaminants.

In an embodiment, by regularly undertaking the interventions of preferentially allocating an aircraft with at least one engine with above average exposure to airports, routes or flights with below average exposure, and the aircraft with at least one engine with below average exposure to airports, routes or flights with above average exposure, all of the engines in a fleet can be maintained towards having mutually similar levels of average exposure, and hence are able to provide better overall lifetime, predictability and reliability.

The advantages of the present method are thus identical to those disclosed above in connection with the present system and the embodiments listed above in connection with the system apply mutatis mutandis to the method.

The present disclosure provides a computer program product comprising instructions to cause the above system to carry out the above method.

The advantages of the present computer program product are thus identical to those disclosed above in connection with the present system and the embodiments listed above in connection with the system apply mutatis mutandis to the computer program product.

In an embodiment, the historical exposure of the aircraft or aircraft engines, or both, to one or more contaminants is calculated based on actual flight profile data.

In another embodiment, the historical exposure of the aircraft or aircraft engines, or both, to one or more contaminants is calculated based on modeled flight profile data.

In yet another embodiment, the historical exposure of the aircraft or aircraft engines, or both, to one or more contaminants is calculated based on an individual flight basis.

In yet another embodiment, the historical exposure of the aircraft or aircraft engines, or both, to one or more contaminants is calculated based on aggregated averages, for example aggregated contamination exposure.

In an embodiment, a service or assignment of flights can be adjusted such that at least one aircraft engine having above-average exposure to dust for a period is ready for maintenance according to a planned maintenance schedule, and thus other aircraft engines benefit from the reduced contaminant exposure.

In another embodiment, if given currently planned services result in an engine requiring maintenance earlier than a planned maintenance schedule, the engine's service or assignment is optionally adjusted to prolong its life to meet the planned maintenance schedule.

The system, when in operation, determines at least one engine health parameter for an aircraft engine using a predictive engine health model by employing:
(a) a computing arrangement including at least one input interface and at least one output interface, wherein
 (i) the computing arrangement executes, when in operation, a predictive aircraft health model, wherein the computing arrangement accesses when in operation a database of atmospheric contamination data defined as a function of location and time;
 (ii) the at least one input interface receives flight data relating to an aircraft to be evaluated and provides the flight data to the computing arrangement;
 (iii) the at least one output interface provides at least one predicted aircraft health parameter to a user; and
(b) wherein, after training, the computing arrangement uses the predictive engine health model and the inputs to:
 (i) determine a contaminant exposure measure for a target aircraft by retrieving atmospheric contaminant data at a spatial location and a time in proximity to at least one flight of the target aircraft; and
 (ii) using the predictive aircraft health model to derive at least one predicted aircraft health parameter for the target aircraft based upon at least the target aircraft flight history and contaminant data as a function of spatial location and time, wherein the control module outputs the at least one predicted aircraft health parameter to the at least one output interface.

Optionally, in the aircraft atmospheric contamination determination system, the computing arrangement is trained by interrogating the database of contamination data to:
 (i) obtain a set of training data by retrieving the atmospheric contaminant data at a spatial location and a time in proximity to at least one flight in the aircraft flight data; and
 (ii) provide the historical contaminant exposure and the aircraft service data as inputs for use in training the predictive aircraft health model.

The system optionally further, when in operation, generates a predictive engine health model to determine an aircraft engine health. The predictive engine health model is trained, for example beforehand prior to being used for making predictions (namely, a priori) by machine learning by providing a set of training data comprising historical aircraft flight data, historical atmospheric contaminant data as a function of spatial location and time and historical engine service data. The system optionally further, when in operation, determines at least one measure of historic atmospheric contaminant exposure of the set of training data by retrieving the atmospheric contaminant data at a spatial location and a time in proximity to at least one flight in the aircraft flight data. The system optionally further, when in operation, determines at least one engine health parameter based on the engine health and engine life data derived from maintenance records and train the predictive engine health model by providing the historical contaminant exposure, the historical engine service data (as input variables) to predict at least one engine health parameter.

In an embodiment, the system optionally, when in operation:
(i) provides a set of training data comprising historical aircraft flight data, historical atmospheric contaminant data as a function of spatial location and time and historical engine service data;
(ii) determines at least one measure of historic atmospheric contaminant exposure of the set of training data by retrieving the atmospheric contaminant data at a spatial location and a time in proximity to at least one flight in the aircraft flight data;
(iii) provides the historical contaminant exposure and the engine service data to a predictive engine health model;
(iv) retrieves atmospheric contaminant data at a spatial location and a time in proximity to at least one flight of the target aircraft engine and an engine service data; and
(v) determines contaminant exposure per flight based on the atmospheric contaminant data at a location and a time in proximity to at least one flight of the target aircraft engine.

The system optionally predicts at least one engine health parameter as an output variable for the aircraft engine using the predictive engine health model based on at least one of target aircraft engine flight history and contaminant data as a function of spatial location and time. The system optionally provides at least one of alerts or scheduling maintenance interventions for the aircraft engine based on the predicted engine health parameter.

The system optionally comprise a computing arrangement, wherein the computing arrangement includes a control module comprising a processor and a memory containing a set of instructions executed by the processor to perform above mentioned operation of determining at least one engine health parameter. The system optionally provides notifications to adopt maintenance and service for target aircraft engine based on the predicted at least one engine health parameter. The system optionally comprises an input interface for receiving historical or actual aircraft flight data, or both, relating to an aircraft engine to be evaluated. The system optionally further comprises a storage medium containing a database of historical or actual atmospheric contamination data, or both, as a function of spatial location and time. The system optionally further comprises an output interface to provide predicted at least one engine health parameter and notifications to adopt maintenance and service for a given aircraft engine based on the predicted at least one engine health parameter pertaining to the given engine.

In an embodiment, the predicted engine health parameter is selected from a group comprising: a cycle count, a hour count, remaining cycles, remaining hours or a health index.

In another embodiment, the processor further calculates and outputs at least one of a standard deviation, variance or confidence interval when providing the predicted health parameter.

In yet another embodiment, the predictive engine health model determines:
(i) at least one contaminant parameter as a part of the set of training data; and
(ii) at least one engine health parameter for each engine or aircraft associated with the set of training data.

In yet another embodiment, the flight data includes flight trajectory information that is selected from at least one of: a flight phase, an estimation of airspeed or engine mass flow, or both. The airspeed or engine mass flow, or both, are estimated to weight a significance of the at least one contaminant to provide estimates of rate, density or mass of contaminants passing through the aircraft engine.

In yet another embodiment, the input interface further receives one or more input variables that are utilized by the processor or predictive engine health model. The one or more input variables optionally includes one or more of: engine or aircraft control, loading or operational parameters, engine or aircraft model and type information, sensor data, weather parameters, temperatures, speeds, altitudes, mass flow rates, fuel flow rates, vibration measures, inspection results, or wear estimates.

In yet another embodiment, the system determines historic contaminant exposure by:
(i) analyzing a plurality of historical trajectories of a plurality of aircraft engines associated the set of training data as a function of spatial location and time; and
(ii) estimating contaminant concentration of the plurality of aircraft engines for each trajectory using an atmospheric model.

In yet another embodiment, the processor, when in operation, uses the engine health model to provide estimates of future contamination exposure of the aircraft engine as a function of time by estimating a probability, a probability density function, or multiple parameters including expected mean and standard deviation of estimated contaminant exposure and the maintenance management system utilizes the estimates to schedule interventions. Machine learning (ML) employs one or more algorithms provided by way of one or more software products that are executable on computing hardware, wherein the algorithms are adaptive to data being processed via the algorithms; beneficially, the algorithms are configured using training data, for example during initial setup. The algorithms beneficially employ explicit functions, whose parameters are adjusted using the machine learning.

In an embodiment, the machine learning comprises any one of: linear regression, neural network, decision tree, decision forest or gradient boosted decision tree, radial basis function, support vector machine, Gaussian process, or principal component analysis.

The machine learning optionally includes at least one of: a time within a year, a time of day, as regression parameters.

In an embodiment, the atmospheric contaminant data over location and time comprises an atmospheric model of the concentration and/or mixing ratio of contaminants at a plurality of locations and times.

In another embodiment, the contaminants include a plurality of contaminants selected from: dust, organic particles, volcanic ash, salt, sulphur dioxide and sulphate ions, or any combination thereof.

In yet another embodiment, the atmospheric model derives estimates of the mixing ratio or the concentration of contaminants, or both, at the plurality of locations and times and provides an expected mass of the respective contaminant per unit mass of air at a particular location, height measure, and time.

In yet another embodiment, the atmospheric model provides at least one of:
an estimated average, a standard deviation of contaminants for each spatial location, by at least one of: time-of-day, time-of-year.

In yet another embodiment, the aircraft flight data comprises flight phase and estimation of at least one of airspeed or engine mass flow and associated location, time and date information.

In yet another embodiment, the system optionally uses the predictive model to predict an engine health parameter, for example by employing a Monte Carlo model.

The system optionally further calculates the remaining useful life (RUL) of the aircraft engine or the aircraft by using a table for representing data. The table includes recorded data of the aircraft engine and a last row of the table indicates a target life when the aircraft engine is ending. For example, the last row shows a zero (0) and the second last row shows a one (1), and hence the third last row shows a two (2). The system optionally uses the RUL to provide servicing and schedule maintenance accordingly when an aircraft has an engine at 50% health and may swap the aircraft engine if needed or for those events to coincide with the end of life (0) of the aircraft engine. For example, an aircraft engine E1 is in poor condition and an aircraft engine E2 is in good condition, at the end of life both the aircraft engines E1, E2 appear the same. In one embodiment, the system optionally determines the engine health index using a transform. For example, when all aircraft engines are new, it is considered as hundred (100). The out of life of an aircraft engine is zero (0). The method is capable of calculating a straight-line interpolation of these two values and start with hundred (100) and end with zero (0) and points providing a graph of the Health Index to obtain more accurate prediction.

In an embodiment, the determination of health Index requires more calculations as the extrapolation step for prolonging the life of the aircraft engine.

Embodiments of the present disclosure beneficially help to schedule aircraft operations by estimating expected atmospheric contaminant exposure for the aircraft or aircraft engine. Embodiments of the present disclosure optionally help to schedule aircraft operations based on the estimation of contamination exposure, which has an impact on the cost of operating the aircraft engines. Embodiments of the present disclosure optionally adjust the service of aircraft engines to increase overall engine cycles between shop visits. This practice is capable of reducing an engine vendor's or owner's maintenance costs and use of material resources, and motivate them to adopt this practice, especially when carbon dioxide ($CO_2$) emissions savings are financially redeemable as "carbon credits".

DETAILED DESCRIPTION OF THE DRAWINGS

FIG. 1 is a schematic illustration of a system according to an embodiment of the present disclosure. The system 100 comprises a computing arrangement including elements that mutually interact, wherein the elements include a control module 102. The control module 102 includes a processor 104, a memory 106 and a storage medium 108. The storage medium includes a database 110. The system 100 further includes a route input interface 112, a fleet input interface 114 and an output interface 116. The function of these parts has been described above.

Figure 2:
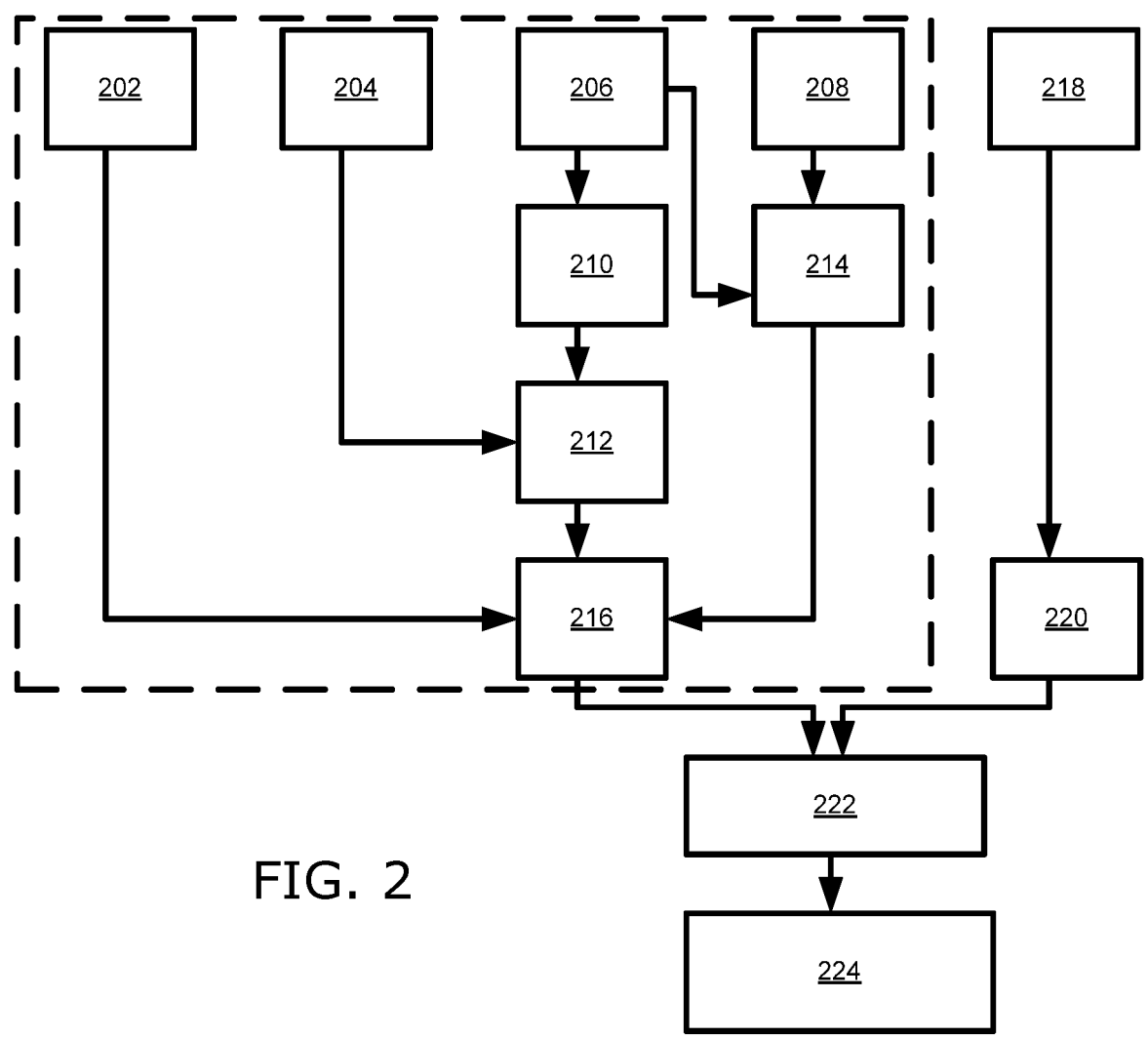
FIG. 2 is an illustration of a flow diagram illustrating steps of a method for (of) training an engine health model to predict an engine health parameter of an aircraft engine or an aircraft according to an embodiment of the present disclosure.

FIG. 2 is a flowchart illustrating steps of a method for (of) training an engine health model to predict an engine health parameter of an aircraft engine according to an embodiment of the present disclosure; as aforementioned, the engine health model beneficially utilizes machine learning (ML) to improve an accuracy if the engine health model, based on training data to configure initially the machine learning. At a step 202 of the method for training, one or more input variables that include engine or aircraft control, loading or operational parameters, engine or aircraft model and type information, sensor data, weather parameters, temperatures, speeds, altitudes, mass flow rates, fuel flow rates, vibration measures, inspection results or wear estimates, are obtained. At a step 204 of the method for training, atmospheric contaminant data as a function of spatial location and time are obtained from a contamination database. At a step 206 of the method for training, aircraft flight history is obtained from an historical database. At a step 208 of the method for training, assignment data of aircraft engines and engine service data are obtained from the historical database. At a step 210 of the method for training, historical aircraft trajectories are determined from the historical database.

At a step 212 of the method for training, contaminant exposure measure for a target aircraft engine is determined by retrieving atmospheric contaminant data at a spatial location and a time in proximity to at least one target aircraft engine. At a step 214 of the method for training, engine run time, cycles and hours are determined from the assignment data of engines to the aircraft, the engine service data, and the aircraft flight history. At a step 216 of the method for training, inputs such as the historical contaminant exposure, the engine service data and the one or more input variables are provided to an engine health model. At a step 218 of the method for training, engine health and engine life data are derived from maintenance records. At a step 220 of the method for training, output variables are selected for the engine. At a step 222 of the method for training, the engine health model is trained to provide a predictive model using machine learning, as aforementioned.

At a step 224, an engine health parameter of the target aircraft engine is predicted and the effect of contaminants is incorporated using the predictive model.

Figure 3:
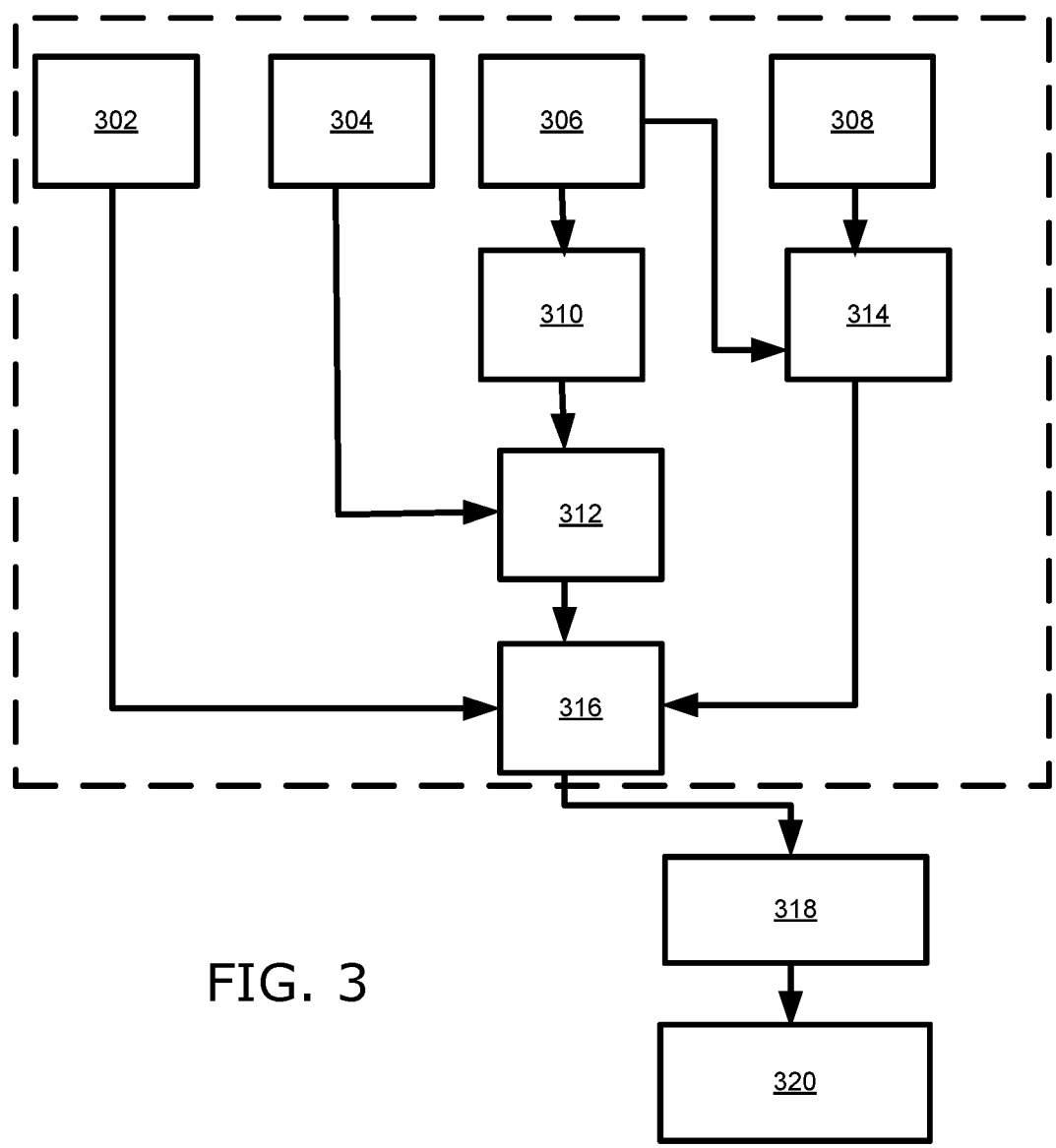
FIG. 3 is an illustration of a flow diagram illustrating steps of a method for (of) predicting a engine health parameter of the engine or the aircraft using a predictive engine health model according to an embodiment of the present disclosure.

FIG. 3 is a flowchart illustrating steps of a method for (of) predicting an engine health parameter of the engine or the aircraft using a predictive engine health model in accordance with an embodiment of the present disclosure. At a step 302 of the method for predicting, one or more input variables are obtained. At a step 304 of the method for predicting, atmospheric contaminant data over location and time are obtained from a contamination database of contamination data as a function of spatial location and time. At a step 306 of the method for predicting, an aircraft flight history is obtained from a historical database of historical data. At a step 308 of the method for predicting, assignment data of engines to aircrafts and engine service data are obtained. At a step 310 of the method for predicting, historic aircraft trajectories are determined from the historical database. At a step 312 of the method for predicting, contaminant exposure measurements for a target aircraft engine are determined by retrieving atmospheric contaminant data at a spatial location and a time in proximity to at least one flight of the target aircraft engine; the measurements are obtained by using a sensor arrangement. At a step 314 of the method for predicting, an engine run time, cycles and hours are determined from the assignment of engines to the aircraft and the engine service data and the aircraft flight history. At a step 316 of the method for predicting, inputs such as the historical contaminant exposure and the engine service data and the one or more input variables are provided to an engine health model. At a step 318 of the method for predicting, an engine health parameter of the target aircraft engine is predicted, and effects of contaminants are incorporated using the predictive model. At a step 320 of the method for predicting, engine health and remaining useful life are predicted using the predictive model.

Figure 4:
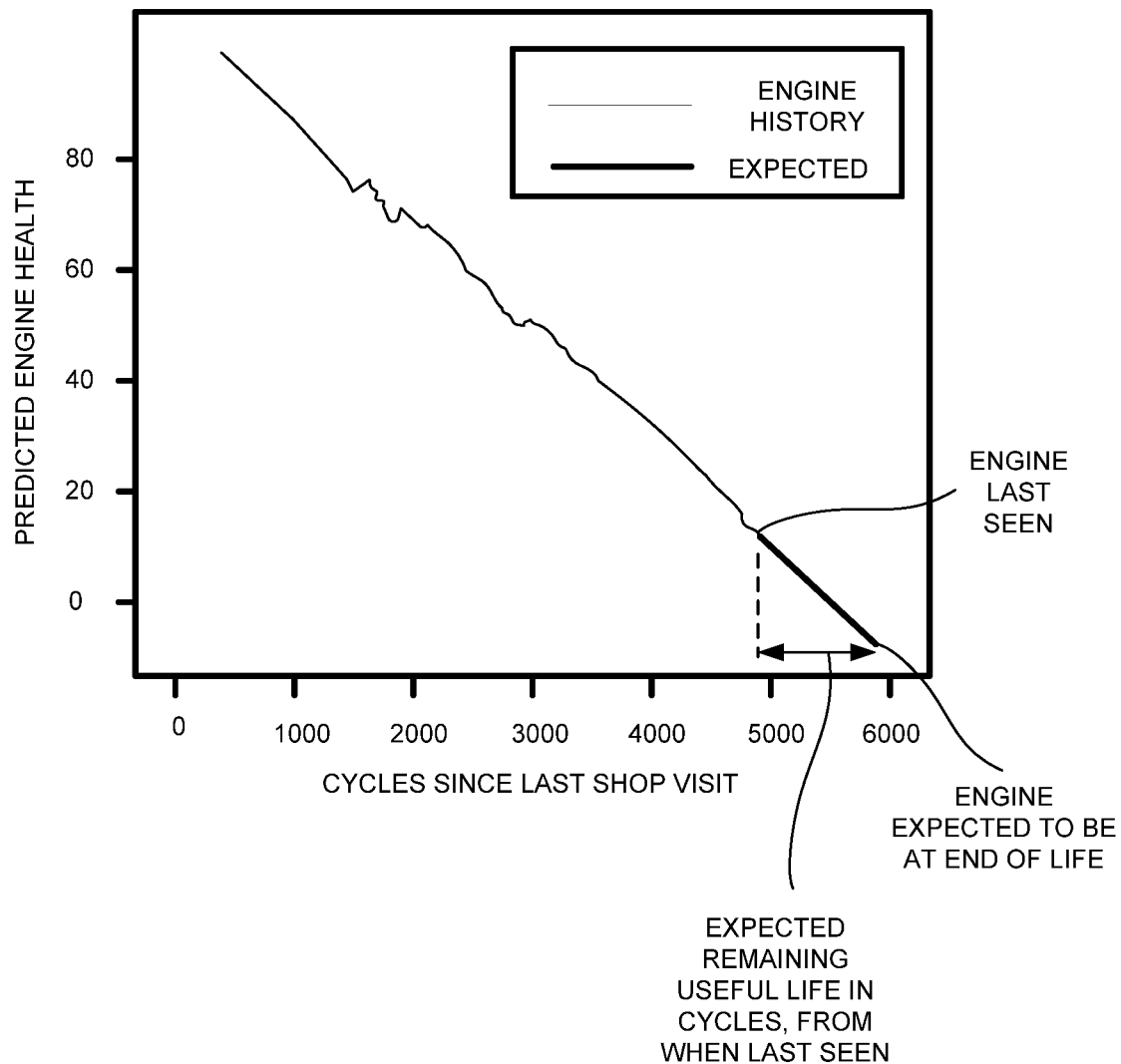
FIG. 4 is a graphical illustration of a predicted engine health in the Y-axis plotted against a number of cycles since a last shop visit in the X-axis to predict an expected remaining useful life according to an embodiment of the present disclosure.

FIG. 4 is a graphical illustration of a predicted engine health in an ordinate Y-axis plotted against a number of cycles since last shop visit in an abscissa X-axis to predict an expected remaining useful life in accordance with an embodiment of the present disclosure. An expected end of life of an aircraft engine is determinable from an output of the predictive engine health model. The expected end of life of an aircraft engine is beneficially used to plan when the aircraft engine requires replacement or removal or a shop visit. In an embodiment, a life of the aircraft engine is reduced from a last service or shop visit if the environmental contaminant exposure affects the aircraft engine. The life of the aircraft engine is extended as expected to be at the end of life of the aircraft engine by predicting an engine health parameter using the predictive engine health model. For example, a number of cycles since last shop visit is increased from 5000 to 6000 when the engine health parameter of at least one aircraft engine is predicted. In an embodiment, an expected remaining useful life in cycles for an aircraft engine is automatically determined from the last shop visit or service. The engine health index is calculated in a range of values from 0 to 100 on a scale. In an embodiment, a value 100 indicates a new engine with an ideal performance, and a value 0 indicates that the aircraft engine requires a shop visit.

Figure 5:
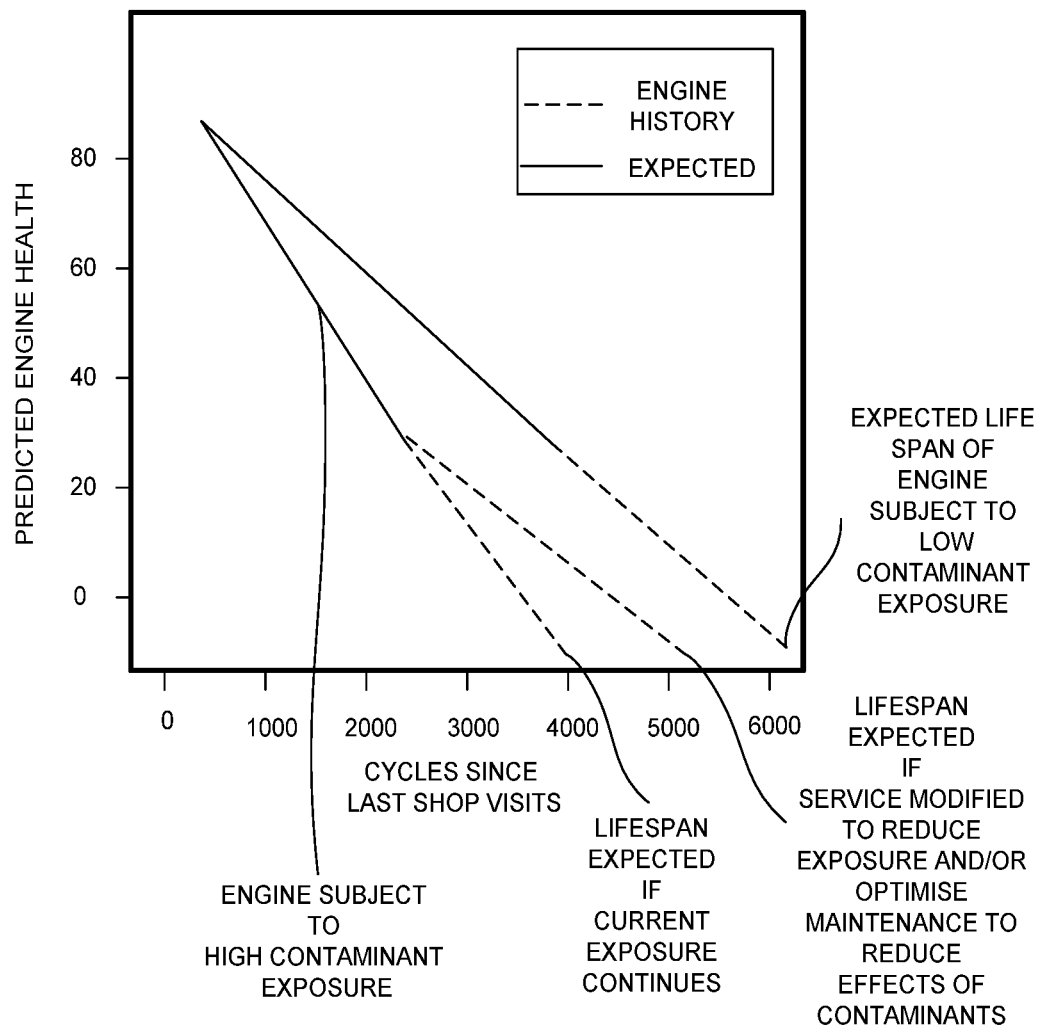
FIG. 5 is a graphical illustration of a predicted engine health in an ordinate Y-axis plotted against a number of cycles since last shop visit in an abscissa X-axis to predict an expected lifespan of the engine for different levels of exposure to contaminants according to an embodiment of the present disclosure.

FIG. 5 is a graphical illustration of a predicted engine health in an ordinate Y-axis plotted against a number of cycles since last shop visit in an abscissa X-axis to predict an expected lifespan of the engine for different levels of exposure to contaminants in accordance with an embodiment of the present disclosure. The graphical illustration elucidates an effect of an intervention on an aircraft engine that had previously been subjected to high contaminant exposure is indicated. An expected lifespan of the aircraft engine is reduced if a current exposure continues (for example, a lifespan of the of the aircraft engine may be 4000 cycles when the engine is subjected to a high contaminant exposure). The expected lifespan of the aircraft engine increases if a service is modified or a maintenance practice is improved to reduce future contaminant exposure and optimise maintenance to reduce effects of contaminants (for example, the lifespan of the engine or the aircraft is increased from 4000 cycles to 5000 cycles). The graphical illustration further elucidates that the expected lifespan of an aircraft engine is increased when the aircraft engine is subject to a low contaminant exposure.

Figure 6:
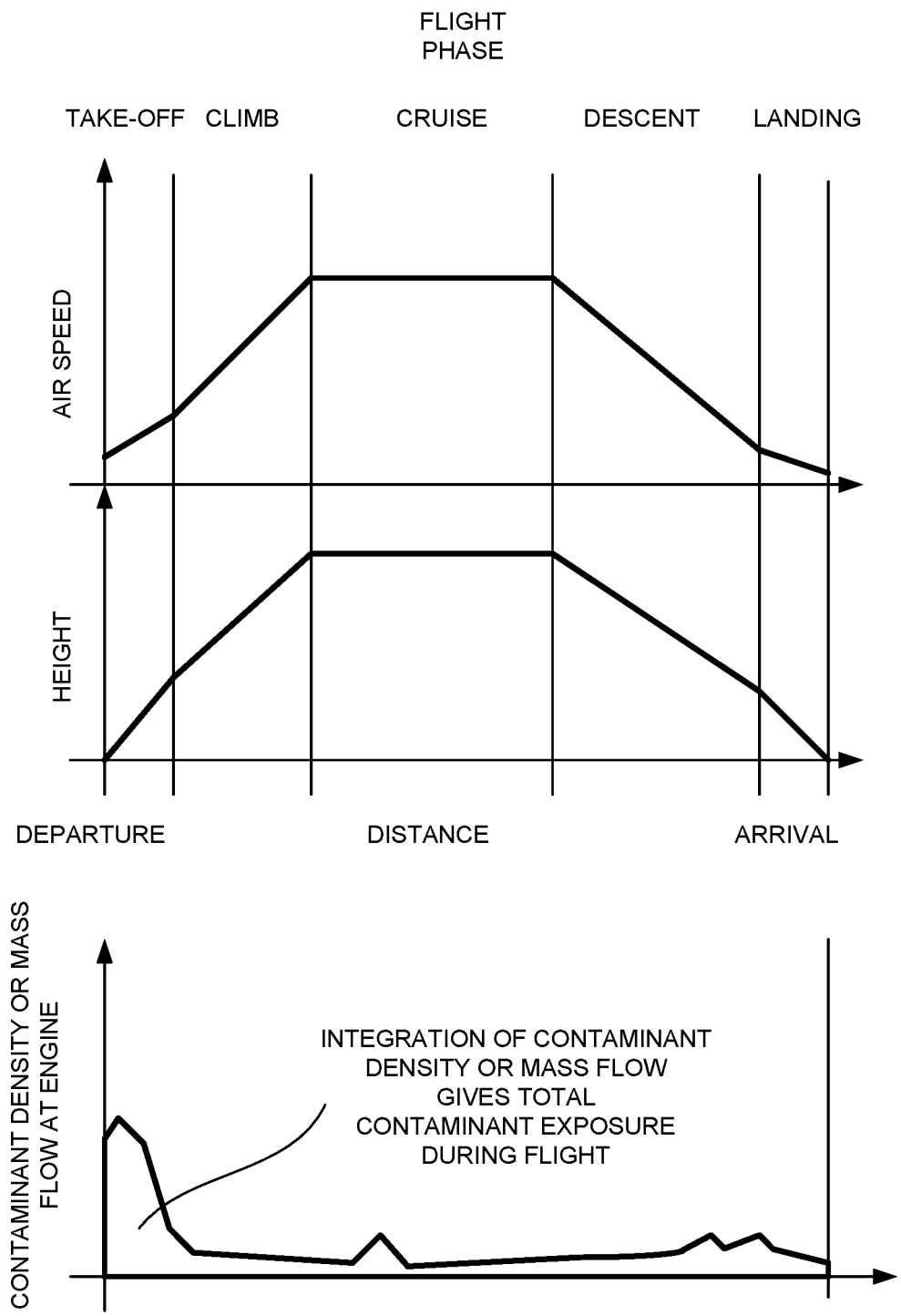
FIG. 6 is a graphical illustration of a flight trajectory model of flight phases and contaminant density at the engine at the flight phases according to an embodiment of the present disclosure.

FIG. 6 is a graphical illustration of a flight trajectory model of flight phases and contaminant density at the engine at the flight phases in accordance with an embodiment of the present disclosure. The graphical illustration elucidates that the distance is plotted in respect of an abscissa X-axis, and the airspeed is plotted in respect of an ordinate Y-axis. The graphical illustration further elucidates that the distance is plotted in respect of the X-axis and the height is plotted in respect of the Y-axis. The graphical illustration elucidates the airspeed at different flight phase includes take-off, climb, cruise, descent and landing of a flight and the height of the flight which is varied at departure, cruise and arrival of the flight. A control module beneficially determines an exposure index which is a measure of a contaminant exposure or an amount of contaminant material that passes through the aircraft engine in the aircraft fleet based on its flight trajectory. The total contaminant exposure during flight is obtained using integration of contaminant density or mass flow at the aircraft engine.

Figure 7A:
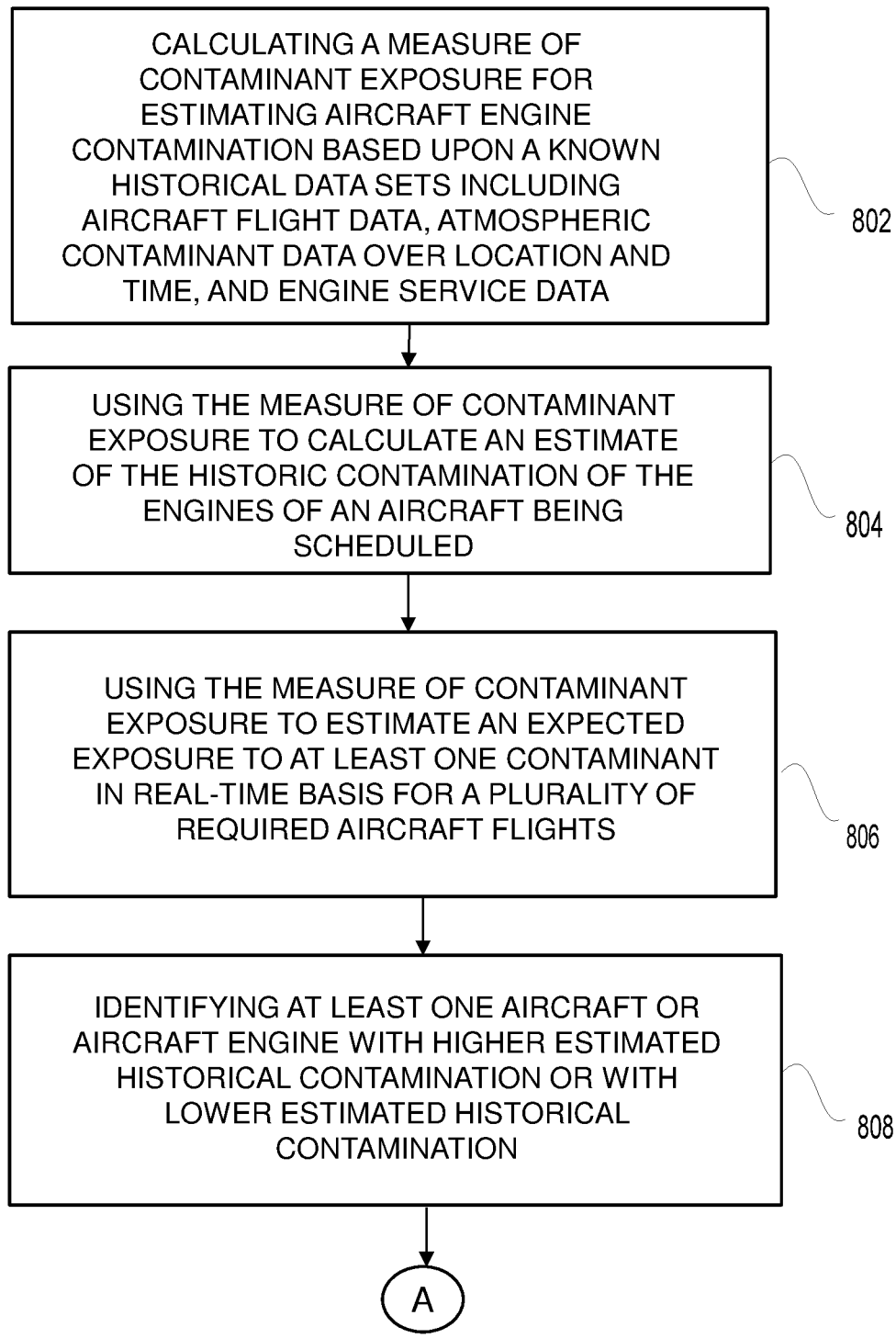
FIGS. 7A and 7B are illustrations of a flow diagram of steps of a method for (of) scheduling aircraft operations, according to an embodiment of the present disclosure.
Figure 7B:
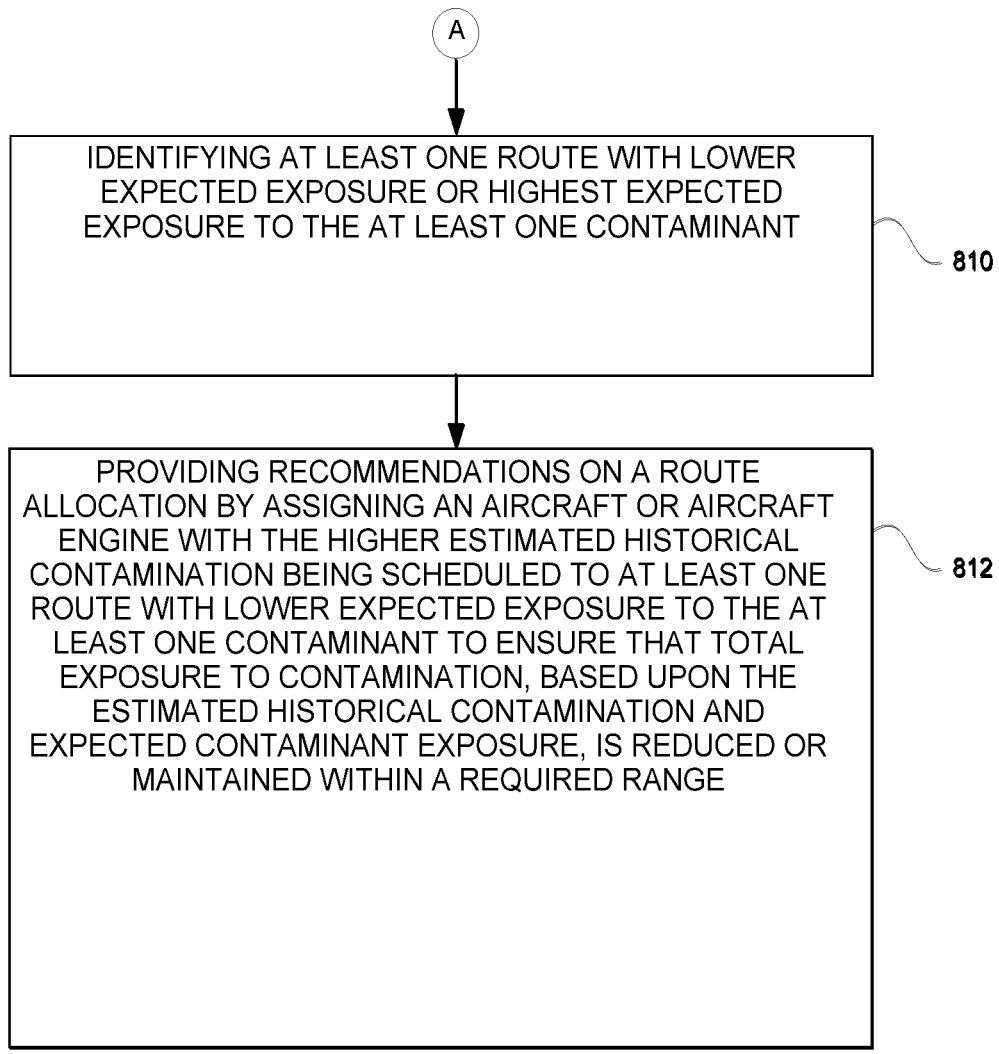

FIGS. 7A and 7B are a flow diagram that illustrates steps of a method for (of) scheduling aircraft operations, in accordance with an embodiment of the present disclosure. At a step 802 of the method for scheduling, a measure of contaminant exposure for estimating aircraft engine contamination based upon known historical data sets including aircraft flight data, atmospheric contaminant data over location and time, and engine service data is calculated. At a step 804 of the method for scheduling, an estimate of the historic contamination of the engines of an aircraft being scheduled is calculated using the measure of contaminant exposure. At a step 806 of the method for scheduling, an expected exposure to at least one contaminant is estimated based on a plurality of required aircraft flights using the measure of contaminant exposure. At a step 808 of the method for scheduling, at least one aircraft engine with higher estimated historical contaminant exposure or with lower estimated historical contaminant exposure is identified. At a step 810 of the method for scheduling, at least one route with lower expected exposure or higher expected exposure to the at least one contaminant is identified. At a step 812 of the method for scheduling, recommendations on a route allocation are implemented by assigning the aircraft with the higher estimated historical contaminant exposure being scheduled to at least one route with lower expected exposure to the at least one contaminant to ensure that total exposure to contamination, based upon the estimated historical contaminant exposure and expected contaminant exposure, is reduced or maintained within a required range is provided.

Figure 8:
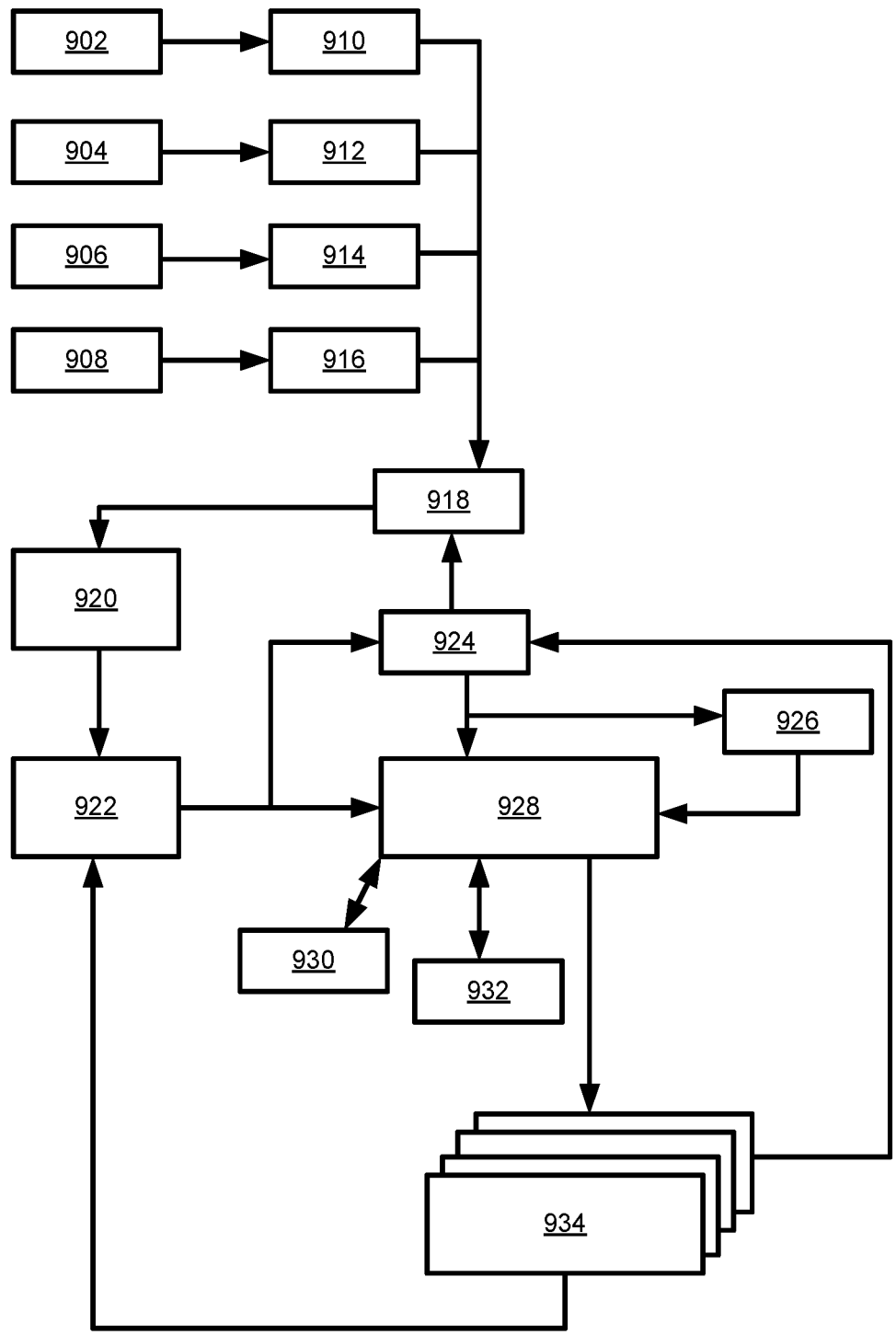
FIG. 8 is an illustration of steps of a method for (of) determining contaminant data using a server according to an embodiment of the present disclosure.

In FIG. 8, there are illustrated steps of a method for (of) determining contaminant data using one or more servers, a supercomputing or a distributed computing platform, or both, according to an embodiment of the present disclosure. At a step 902 of the method for (of) determining contaminant data, satellite data is obtained. At a step 904 of the method for (of) determining contaminant data, flight monitoring data is obtained. At a step 906 of the method for (of) determining contaminant data, surface measures are obtained. At a step 908 of the method for (of) determining contaminant data, radiosondes data is obtained; such data is acquired using a sensor arrangement. At a step 910 of the method for (of) determining contaminant data, the satellite data is processed. At a step 912 of the method for (of) determining contaminant data, the flight monitoring data is processed. At a step 914 of the method for (of) determining contaminant data, the surface measures are processed; the surface measures are sensed using a sensor arrangement. At a step 916 of the method for (of) determining contaminant data, the radiosondes data is processed; this radiosondes data is sensed using a sensor arrangement. At a step 918 of the method for (of) determining contaminant data, import data is calibrated. At a step 920 of the method for (of) determining contaminant data, boundary conditions for the import data are determined and configured. At a step 922 of the method for (of) determining contaminant data, the determined boundary conditions are provided to a supercomputing or a distributed computing platform, or both. At a step 924 of the method for (of) determining contaminant data, the determined boundary conditions are validated. At a step 926 of the method for (of) determining contaminant data, weather models are determined. At a step 928 of the method for (of) determining contaminant data, the boundary conditions, the weather models and the validated boundary conditions are obtained and processed by the supercomputing or distributed computing platform, or both. At a step 930 of the method for (of) determining contaminant data, the processed data is stored in a storage or distributed storage. At a step 932 of the method for (of) determining contaminant data, the processed data are stored in a working memory. At a step 934 of the method for (of) determining contaminant data, contaminant distribution of at least one of latitude and longitude, altitude and pressure level or time are forecasted using the supercomputing or the distributed computing platform, or both. In an embodiment, the forecast of contaminant data is generated for various latitudes, longitudes, altitudes, pressure levels or time.

Figure 9:
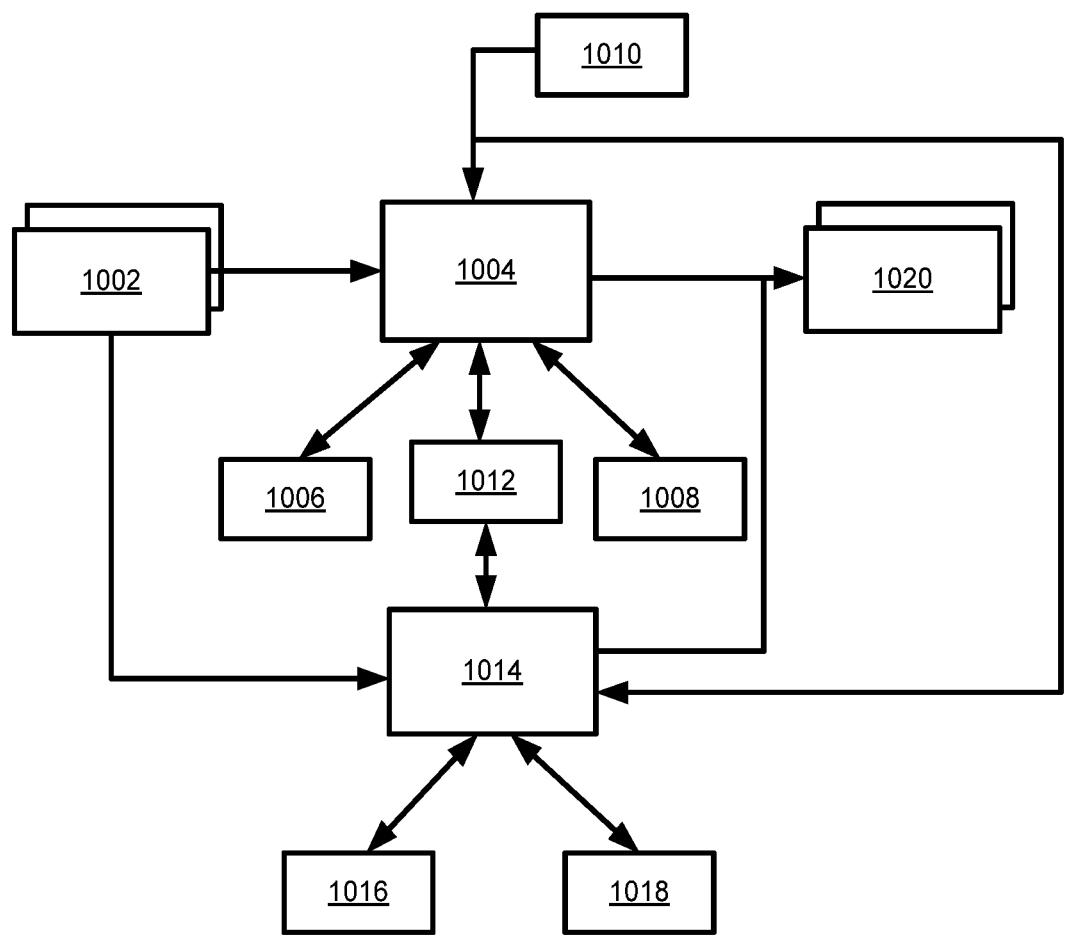
FIG. 9 is an illustration of an exploded view of a distributed computing system or cloud computing implementation according to an embodiment of the present disclosure.

FIG. 9 is an illustration of an exploded view of a distributed computing system or cloud computing implementation according to an embodiment of the present disclosure. The exploded view comprises an input interface 1002, a control module that comprises a processor 1004, a memory 1006 and a non-volatile storage 1008, processing instructions 1010, a shared/distributed storage 1012, a server that comprises a server processor 1014, a server memory 1016 and a server non-volatile storage 1018 and an output interface 1020. The function of the server processor 1014, the server memory 1016 and the server non-volatile storage 1018 are thus identical to the processor 1004, the memory 1006 and the non-volatile storage 1008 respectively. The functions of these parts are as has been described above.

Figure 10:
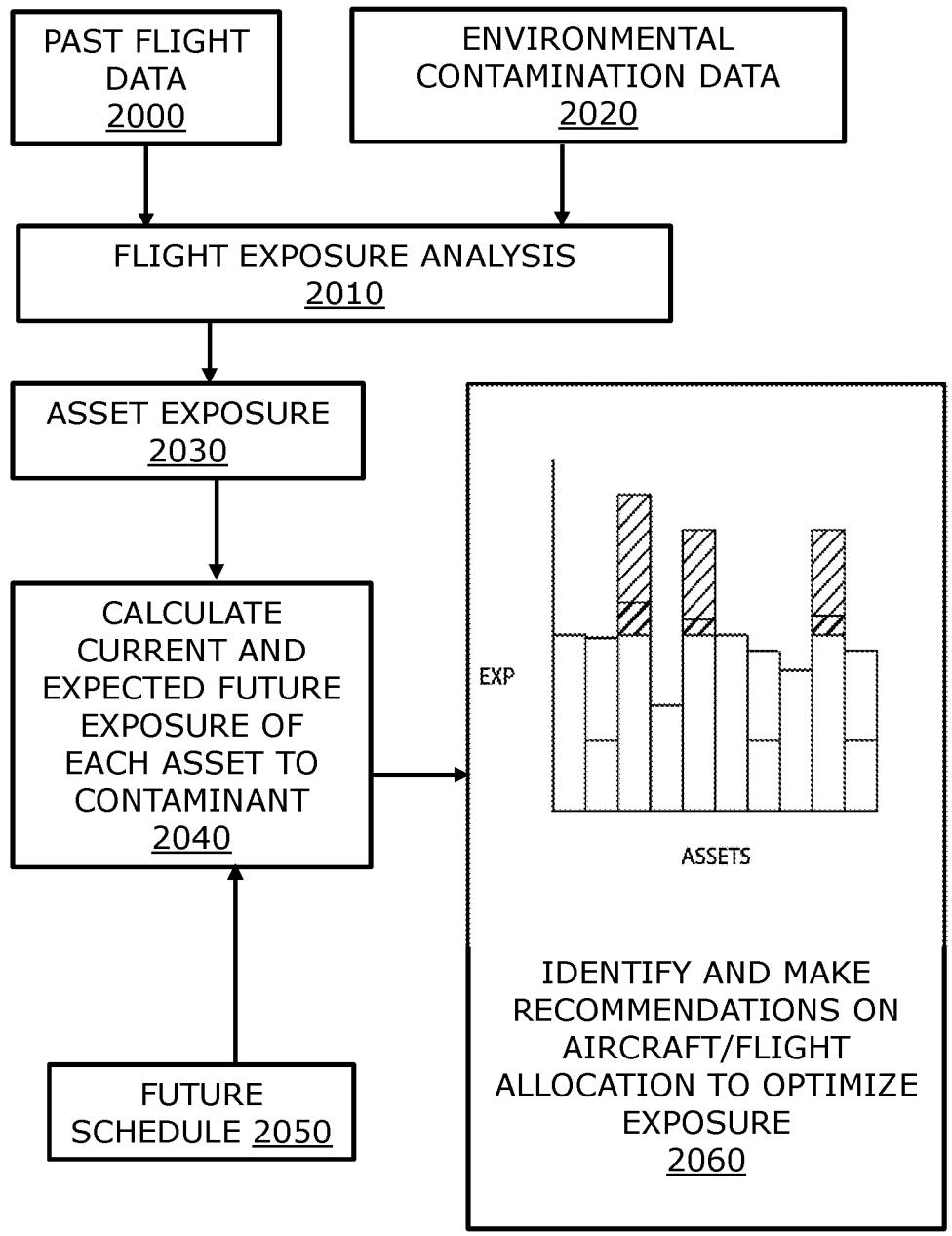
FIG. 10 is a flowchart diagram illustrating steps of a method for (of) determining current and future exposures of assets to contaminants and making recommendations according to an embodiment of the present disclosure.

FIG. 10 is a flowchart diagram illustrating steps of a method for (of) determining current and future exposure of assets, for example aircraft or aircraft engines, to contaminants and making recommendations in accordance with an embodiment of the present disclosure. In FIG. 10, past flight data is denoted by 2000, and atmospheric contamination data is denoted by the 2020. In a first step, the data 2000, 2020 are supplied in operation to a flight exposure analysis module 2010. In a second step, output results that are representative of exposure to contaminants are supplied from the flight exposure analysis module 2010 to an asset exposure module 2030. In a third step, a module 2050 is employed to calculate a current and expected future exposure of each asset, for example component parts of a given aircraft, to atmospheric contamination. In a fourth step, a future schedule module 2050 provides data indicative of a future flight pattern for the given aircraft. In a fifth step, a module 2040 computes an expected exposure to contaminants when the given aircraft follow the future flight pattern. In a sixth step, a module 2060 receives output data from the module 2040 to identify and to make recommendations on aircraft/flight allocations to achieve a more optimized exposure of the given aircraft to atmospheric contaminants.

Figure 11:
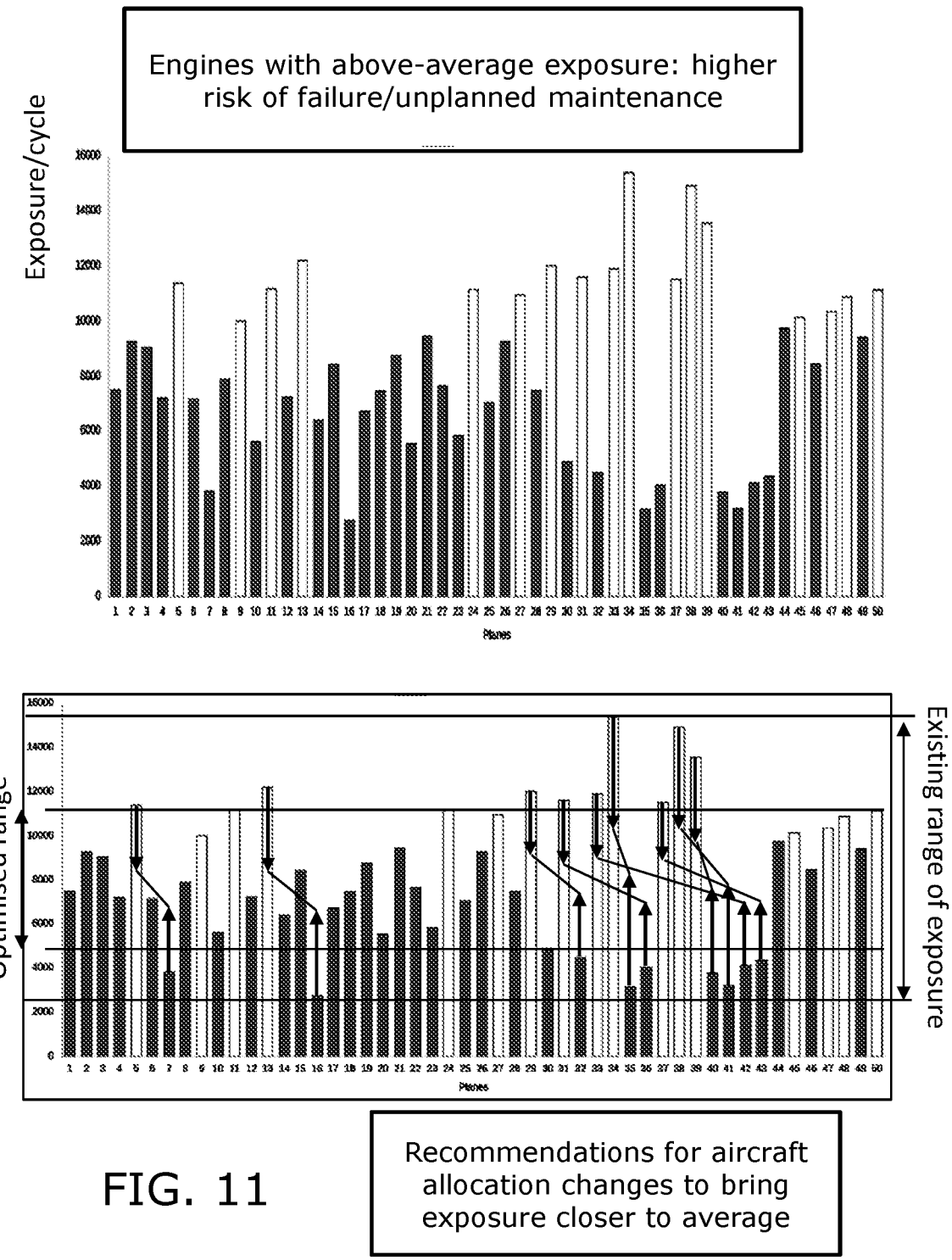
FIG. 11 is a graphical illustration of the distribution of exposure per cycle to a contaminant in respect of a fleet of aircraft under an example flight schedule scenario, wherein there is illustrated a method for (of) swapping aircraft between routes to normalise exposure according to an embodiment of the present disclosure.

FIG. 11 is a graphical illustration of the distribution of exposure per cycle to a contaminant across a fleet of aircraft under an example flight schedule scenario, showing a method of swapping aircraft between routes to normalise exposure in accordance with an embodiment of the present disclosure. Results illustrated in FIG. 11 represent output provided from the method represented and described with reference to FIG. 10.

In embodiments of the disclosure as described in the foregoing, for example where machine learning is employed, it will be appreciated that an estimate of atmospheric contaminant risk is beneficially computed by employing at least one of: a statistical model, a regression model, a machine learning model; at least one historical or present ("live") data set of atmospheric contaminant data is beneficially employed. Moreover, the statistical model or machine learning model is calibrated, trained or optimized by using the at least one historical or present ("live") data set of atmospheric contaminant data or simulations of atmospheric contaminant risk. For example, a statistic method is used to estimate a risk that atmospheric contamination may pose to a given aircraft or aircraft engine. For example, the risk can be calculated using Bayes' theorem as a statistical method:

A represents a contaminant risk,
B represents contaminant estimates from an NWP model,
p(A) represents prior knowledge of contaminant risk, and
p(B) represents statistical uncertainty relating the location, height or time position of a weather event,
wherein the risk in the presence of contaminants is susceptible to being estimated using Bayes' theorem by using:

$$p(A|B)=p(B|A)*p(A)/p(B)\cdot p(A)$$

by marginalisation of p(A|B), while p(B|A) and determined by comparison of estimated contaminants from similar NWP models that are evaluated using historical data representative of the respective contaminants over regions where one or more aircraft were known to be affected by adverse weather events.

Historical data potentially comprises contaminant mixing ratios, concentrations or integrated amounts estimated using NWP models, or measurements from, radiosondes, ground-based sensors, sensors mounted on aircraft, for events or time points in the past. Moreover, present ("live") atmospheric contaminant data beneficially comprises contaminant mixing ratios, concentrations or integrated amounts estimated using NWP models, or measurements from, radiosondes, ground-based sensors, sensors mounted on aircraft, for times within 24 hours before or after the flight, and beneficially use most recent data that is available. Moreover, a statistical method optionally also comprises a method that estimates at least one probability density, histogram or statistical distribution parameter related to a mean, standard deviation, variance or kurtosis of a distribution of a contaminant, and then uses such at least one parameter to determine a measure indicative of the risk, probability or likelihood that an atmospheric contaminant is potentially present at levels (i.e. volumetric concentrations) above at least one threshold, by comparison with the cumulative distribution function of the contaminant's probability density function associated with the at least one parameter.

It will be appreciated that embodiments of the present disclosure benefit from consideration of spatial or temporal uncertainty. Such consideration is achievable by considering estimated values of a contaminant at multiple spatial points in proximity in location, height or time in the vicinity of a waypoint. Optionally, such values have associated therewith a probability density function. Alternatively, a probability density function, or a parameter such as a standard deviation of a probability density function, is optionally estimated from the multiple points. A risk is calculated for each point in proximity. The overall risk is determinable from the maximum risk, wherein the maximum risk is optionally weighted by the probability density function.

Beneficially, embodiments of the present disclosure employ a numerical model, including a regression model or a machine learning model including without limitation a linear regression, logistic regression, decision tree, random forest, support vector machine, Gaussian process or neural network; the numerical model is beneficially used to estimate atmospheric contaminant risk. The numerical model's coefficients are optionally hand-tuned or trained using a machine learning process.

Beneficially, embodiments of the present disclosure employ a numerical model to estimate a target value, a target category, a probability associated with at least one target value or category, or an uncertainty parameter including a standard deviation, variance or covariance matrix.

Models employed in embodiments of the present disclosure are beneficially trained using historical data of measurements of a contaminant at a plurality of spatial locations and at times in the past, for example as aforementioned. Spatial locations and times are determinable from waypoints or from the use of global satellite navigation systems. Measurements are obtainable using various sensing apparatus including ground-based sensors, aircraft-mounted sensors, satellite sensing, radiosondes. Loss of power or loss of flight control of aircraft (adverse events) and normal power or control (benign conditions and events) are beneficially also considered as measurements of high-risk conditions and normal conditions.

When using models of the present disclosure, measurements are used to derive at least one target value for the model to predict. Values obtained from a NWP model of the contaminant and of other relevant parameters (which optionally include temperature, pressure, altitude, wind speed, flight speed) in the vicinity (in time, altitude or location) of the measurement are beneficially used as features for the models. Derived features are calculable using methods of machine learning, including smoothing, averaging, operations including mean, maximum and standard deviation. Optionally, features are normalised, using normalization weighting as described in the foregoing. Features are also determinable from other sources of atmospheric data, including without limitation, ground-based sensors, aircraft-mounted sensors, satellite sensing, radiosondes. Beneficially, features are indicative of the target atmospheric contaminant and of the physical processes that transport it or influence its risk to an aircraft.

Aforementioned models are beneficially trained using corresponding sets of features and targets using methods employed for machine learning. The estimated target value, and any associated probability or uncertainty parameter, is beneficially used to determine an atmospheric contaminant risk as described in the foregoing.

After training, the model is then applied to features similarly determined from historical data or present ("live") data, to provide a measure of atmospheric contaminant risk at corresponding spatial locations and times. Live data may include recent measurements, recent forecasts, nowcasts and other ground-based sensors, aircraft-mounted sensors, satellite sensing, radiosondes, beneficially within 24 hours and beneficially as close in location and time to a waypoint of interest. A probability or uncertainty parameter determined by a model beneficially provides a measure of spatial or temporal uncertainty.

An overall risk for a flight or when traversing a given region is optionally determinable by combining an estimated atmospheric contaminant risk from two or more waypoints using at least one of the following operations: mean, maximum, Lp-norm.

Beneficially, an index of risk is determinable by comparing an atmospheric contaminant risk (including a probability distribution or value) with a pre-determined scale. Beneficially, values of an index of risk are determinable by comparing at atmospheric pressure with at least one threshold. For example, an index of 1 corresponds to very low risk and to ice water content values below 0.01 g/m$^3$, and index of 2, with a higher risk, to values in a range of 0.01 to 0.1 g/m$^3$, an index of 3 to values in a range of 0.1 to 1 g/m$^3$, and so on. An index of risk is beneficially used to represent an atmospheric contaminant risk.

When presenting atmospheric contaminant risk at the output interface, the system beneficially identifies at least one section of the flight plan with a highest risk or where a risk exceeds a threshold.

Next, embodiments of the present disclosure, as described above, methods of recommending flight plan variants will be considered, for example where aircraft trajectory re-routing is recommended. When making recommendations for flight plan variants, a computing arrangement of a system further comprises a database of at least one of aircraft flight plan variables or air traffic constraints, wherein in operation the computing arrangement calculates at least one modified aircraft flight plan for the at least one aircraft flight based on the at least one of aircraft flight plan variables or air traffic constraints, and generates an estimated atmospheric contamination risk for the modified aircraft flight plan for comparison with the estimated atmospheric contamination risk for the at least one aircraft flight.

The resultant indication related to the estimated atmospheric contamination risk provided via the output interface comprises at least one of: an index of the risk of atmospheric contamination associated with an aircraft flight; a recommendation on modification of at least one aircraft flight plan to mitigate or reduce atmospheric contamination exposure; an indication of portions of the aircraft flight where risk of exposure exceeds a threshold.

Beneficially, the method further comprises using the measure of at least one atmospheric contaminant to calculate at least one estimate of the atmospheric contaminant risk in the vicinity of a modified flight plan and adjusting the flight plan by performing a comparison of a plurality of estimated atmospheric contamination risk associated with each of the modified flight plan and the flight plan.

Beneficially, the method further comprises applying an optimisation to reduce the atmospheric contamination risk versus at least one cost metric associated with alternate flight plan.

Beneficially, when the process determines that an unacceptable risk potentially pertains for a given flight plan, the method presents an alternative flight plan having a lower risk. By reference to air traffic control constraints such as approved corridors, historical flights of other aircraft in a region, at least one candidate alternative flight plan is determinable using flight planning methods, for example known contemporary flight planning methods.

Thus, the methods described in the foregoing are susceptible to being used to determine an atmospheric contaminant risk associated with the at least one alternative flight plan. When an alternative flight plan is considered to offer lower atmospheric contaminant risk, it is beneficially recommended as a possible modification.

Models of the present disclosure, as described in the foregoing, beneficially employ a cost function that optionally includes or combines one or more of estimated cost associated with a flight plan, a differential cost from another flight plan, an estimated duration, a differential duration, an atmospheric contaminant risk. Such a cost function optionally weight each cost input with a mutually different weight representative of their relative magnitude. Moreover, such a cost function beneficially allows the system or flight planners to compare alternative strategies, taking into account that increases in flight duration or cost are potentially acceptable if they provide a lower atmospheric contaminant risk.

Embodiments of the disclosure described in the foregoing are implemented using a computing arrangement, wherein the computing arrangement beneficially receives aircraft flight plan data from the input interface; wherein the at least one aircraft flight plan data includes at least one of a time, a pressure or an altitude, a trajectory and a location representing at least one aircraft flight. Optionally, the flight plan includes take-off and landing airports and a trajectory defined by a list of waypoints defined by expected time, latitude, longitude, altitude.

When only the takeoff and landing airports are provided, a trajectory is estimable using numerical methods, for example by preparing a typical trajectory between the two airports representative of one or more previous paths taken by a given aircraft.

Optionally, a trajectory includes only of one point or a sequence of points representing a part of a flight path of interest for a given aircraft, for example to traverse a region known to be subject to adverse weather conditions. In such an example, the system optionally processes risk only for the part of the flight path of interest for a given aircraft.

Where time data is not otherwise provided, synthesized time data determinable from the scheduled departure or arrival time of a flight. Where only one time is provided, times of each waypoints are determinable iteratively from another known waypoint in turn by dividing a distance between the two waypoints by an aircraft's typical speed during that part of the flight.

In embodiments of the disclosure described in the foregoing, it is convenient that waypoints are known on a similar grid to a numerical weather prediction (NWP) model. Where waypoints are widely separated, they are susceptible to being interpolated or extrapolated, for example on a straight line basis, so that spatial locations are sampled with resolution approximating that of the NWP model.

From the foregoing, it will be appreciated that the estimated atmospheric contamination risk is determined using a measure of at least one atmospheric contaminant for the at least one aircraft flight based upon a location, an altitude or pressure, a trajectory and a time information extracted from the at least one aircraft flight plan data. Beneficially, an NWP model is arranged to compute the concentration or mixing ratio of a contaminant at a plurality of locations, heights and times in proximity to the flight, using methods known in the art such as the WRF and ECMWF models. At one or more waypoints, the computing arrangement beneficially determines an atmospheric contaminant risk by querying the results of an NWP model for that location, time and height to determine a concentration of a contaminant. For example, the NWP model defines the concentration or mixing ratio of ice water, dust, sulphate, sulphur dioxide or sodium chloride. Where the NWP model defines a mixing ratio (for example, in kg of contaminant per kg of air), the concentration is derivable by multiplying the mixing ratio by the density of air at the temperature and pressure estimated at the respective location, time and height.

Where locations, heights or times in the NWP model do not correspond exactly to a waypoint, the closest location, height or time is optionally determined and used to query the NWP model results. Alternatively, interpolation such as linear or bicubic interpolation is used to interpolate the NWP model mixing ratio or concentration at the waypoint.

Next, "risk" as a parameter in embodiments of the disclosure described in the foregoing will be elucidated in greater detail. The expected concentration of a contaminant is optionally used directly when computing a risk. For example, it is known that ice water content poses a particular hazard to aircraft and its concentration is susceptible to being presented to user in embodiments of the present disclosure. Optionally, a threshold is susceptible to being applied to determine a risk. For example, if ice water content exceeds 1 gram per cubic metre, it is potentially considered to pose an unacceptable hazard and therefore will be highlighted as a risk. A pre-determined relationship is optionally used to relate a concentration of a contaminant to a risk. For example, the risk is 10% at a contaminant concentration of 0.1 g/m$^3$, the risk is 30% at a contaminant concentration of 1.0 g/m$^3$, and the risk is 100% at a contaminant concentration of 3 g/m$^3$. Intermediate risk values may be determined by interpolation.

Next, it will be appreciated that embodiments of the disclosure described in the foregoing include a computing arrangement that computes at least one of spatial or temporal uncertainty to derive the indication related to the estimated atmospheric contamination risk. Optionally, a measure of uncertainty is beneficially calculated or derived for the waypoint or closest NWP result location. Moreover, a measure of uncertainty may be estimated by the NWP model by Monte Carlo modelling as known in the art. Moreover, a measure of uncertainty is optionally a value for a particular waypoint or location, or is optionally beneficially averaged or smoothed in respect of regions, heights or times, for example using a Gaussian convolution, to reflect that an estimation of the measure of uncertainty is potentially itself stochastically noisy.

Beneficially, in embodiments of the present disclosure, a probability density function is determined representative of the contaminant density or mixing ratio. By comparing with the probably density function, an estimated concentration and uncertainty is used to determine at least one risk. For example, given an estimated ice water content, a standard deviation of the estimate determined from the measure of spatial or temporal uncertainty, and that the estimation error is considered to follow a Normal distribution, the probability that atmospheric contaminant density at a location potentially exceeds a threshold that is determinable and usable as a measure of the risk. For example, the risk that they contaminant exceeds 1 g/m$^3$ is beneficially presented at the output interface together with its respective location or waypoint.

It is known in the art of NWP that models potentially make errors in locating an event such as a storm or dust storm in space or time. Known methods of NWP estimate a magnitude of such errors, for example by estimating cloud visibility as seen from space and by comparing with satellite images of corresponding events. An uncertainty, namely potential error, is susceptible to vary as a function of time or spatial location. Temporal and spatial uncertainty are related, as is known in the art of Kalman filtering, and thus are potentially interchangeable, for example by considering the speed of movement of a weather event or the underlying wind speed. In the present disclosure, spatial uncertainty is optionally defined by at least one standard deviation. By multiplying by a Gaussian function, this spatial uncertainty is converted to a probability density function sampled over space that is representative of a spatial normal distribution.

When a spatial or a temporal uncertainty is defined over a region (optionally, by a probability density function), a contaminant's uncertainty or distribution is susceptible to being estimated at a location using statistical methods. For example, the NWP results pertaining to the region are susceptible to being considered as an ensemble of samples (optionally, with likelihood determined from the probability density function). The proportion of samples that exceed at least one threshold is susceptible to being considered to approximate the risk (optionally, weighted using the probability density function), providing a beneficial method to estimate the risk, as a probability, that the contaminant exceeds each threshold in the approximate location.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An aircraft operation scheduling system, comprising:

a computing arrangement comprising a database of contamination data, wherein the computing arrangement is configured to:

access the database of the contamination data as a function of spatial location and time:

compute a measure of contaminant exposure to estimate aircraft contamination, based on the access of the database of the contamination data;

receive schedule information related to a plurality of aircraft flights;

derive from the database of the contamination data:

(i) an estimated historical contamination for an aircraft or each aircraft engine of the aircraft by at least one contaminant; and (ii) an estimated expected contaminant exposure for the aircraft or each of the aircraft engine, wherein the expected contaminant exposure of the aircraft or each of the aircraft engine is estimated by real-time determination of an exposure index, which is a measure of contaminant exposure or an amount of contaminant material that passes through the aircraft or each of the aircraft engine in an aircraft fleet based on its trajectory;

identify at least one aircraft or each aircraft engine with higher estimated historical contaminant exposure or with lower estimated historical contaminant exposure;

identify at least one route with lower expected exposure or higher expected exposure to the at least one contaminant; and provide recommendations on route allocation by assigning the at least one aircraft or each aircraft engine with the higher estimated historical contaminant exposure being scheduled to the at least one route with the lower expected exposure to the at least one contaminant.

2. The aircraft operation scheduling system of claim 1, wherein the computing arrangement is further configured to provide recommendations on the route allocation to ensure that a total exposure to contamination, based upon the estimated historical contaminant exposure and the estimated expected contaminant exposure, is reduced or maintained within a required range.

3. The aircraft operation scheduling system of claim 2, wherein the computing arrangement is further configured to employ machine learning utilizing one or more adaptive algorithms, wherein the one or more adaptive algorithms are trained using historical data pertaining to one or more aircraft or one or more aircraft engines.

4. The aircraft operation scheduling system of claim 2, wherein machine learning is used to determine at least one of the following: a selection of a numerical model, coefficients of a numerical model, or a set of features to be used in a numerical model.

5. The aircraft operation scheduling system of claim 2, wherein at least one contaminant exposure is determined using a statistical or machine learning model applied to values of a contaminant determined from at least one of: the database, a web API, a NWP model, a measurement.

6. The aircraft operation scheduling system of claim 2, wherein at least one contaminant exposure is determined using a statistical or machine learning model arranged to compensate for bias or spatial or temporal uncertainty in values of a contaminant determined from at least one of: the database, a web API, a NWP model, a measurement.

7. The aircraft operation scheduling system of claim 2, wherein a measure of spatial or temporal uncertainty is determined using a statistical or machine learning model arranged to receive values of a contaminant determined from at least one of: the database, a web API, a NWP model, a measurement.

8. The aircraft operation scheduling system of claim 1, wherein the computing arrangement further comprises a processor configured to assign the at least one aircraft with the lower estimated historical contaminant exposure to routes with the higher expected exposure to the at least one contaminant during route allocation.

9. The aircraft operation scheduling system of claim 1, wherein the system further comprises:
 an input interface configured to receive further input variables to be utilized by a processor to calculate the measure of contaminant exposure to estimate the aircraft engine contamination, wherein the input variables include at least one of: engine or aircraft control, loading or operational parameters, engine or aircraft model and type information, sensor data, weather parameters, temperatures, speeds, altitudes, mass flow rates, fuel flow rates, vibration measures, inspection results or wear estimates; and
 a distributed computing system, wherein a control module and at least one data storage medium are centralized, and a fleet input interface, a schedule input interface, and an output interface are provided at one or more local computing nodes.

10. The aircraft operation scheduling system of claim 1, wherein the computing arrangement further comprises a control module configured to allocate the exposure index to each of the aircraft engine in the fleet based upon the estimated historic contamination, wherein the amount of the contaminant material that passes through the aircraft or each of the aircraft engine is calculated based on the mass flow rate and the fuel flow rate, and wherein the recommendation on route allocation are optimized to reduce variation in the exposure index across a plurality of aircraft in the fleet as a function of time.

11. The aircraft operation scheduling system of claim 1, wherein the system further comprises a maintenance interface, wherein the maintenance interface is coupled in communication with a control module of the computing arrangement to input data for adjusting the estimated historic contamination for the aircraft or each of the aircraft engine as a result of maintenance interventions and to output alerts for required interventions.

12. The aircraft operation scheduling system of claim 1, wherein the historical contamination of the aircraft is estimated by determining at least one of an average contamination exposure of the aircraft or each of the aircraft engine per cycle, an average contamination exposure of the aircraft or each of the aircraft engine per time interval or a cumulative contamination exposure of the aircraft or each of the aircraft engine and determining historical contamination of at least one flight phase of the aircraft or each of the aircraft engine from the database of contamination data.

13. A method for scheduling aircraft operations, comprising:
 accessing, using a computing arrangement, a database of contamination data, wherein the computing arrangement includes a database of the contamination data;
 calculating, using the computing arrangement, a measure of contaminant exposure to estimate aircraft contamination based upon known historical data sets including aircraft flight data, the contamination data as a function of spatial location and time, and engine service data;
 using the measure of contaminant exposure to calculate, using the computing arrangement, an estimate of historical contamination of the aircraft or engines of the aircraft being scheduled;
 using the measure of contaminant exposure to estimate, using the computing arrangement, an expected exposure to at least one contaminant for a plurality of required aircraft flights, wherein the expected exposure to the at least one contaminant is estimated by real-time determination of an exposure index, which is a measure of contaminant exposure or an amount of contaminant material that passes through the aircraft or the engines of the aircraft in an aircraft fleet based on its trajectory;
 identifying, using the computing arrangement, at least one aircraft or the engines of the aircraft with higher estimated historical contaminant exposure or with lower estimated historical contaminant exposure;
 identifying, using the computing arrangement, at least one route with lower expected exposure or higher expected exposure to the at least one contaminant; and
 providing, using the computing arrangement, recommendations on a route allocation by assigning the aircraft or the engines of the aircraft with the higher estimated historical contaminant exposure being scheduled to the at least one route with the lower expected exposure to the at least one contaminant.

14. The method of claim 13, wherein the method further includes providing, using the computing arrangement, recommendations on the route allocation to ensure that a total exposure to contamination, based upon the estimated historical contaminant exposure and the estimated expected contaminant exposure, is reduced or maintained within a required range.

15. The method of claim 13, wherein the method further includes arranging for the computing arrangement to employ machine learning utilizing one or more adaptive algorithms, wherein the one or more adaptive algorithms are trained using the historical data sets pertaining to one or more aircraft or one or more aircraft engines.

16. The method of claim 13, wherein machine learning is used to determine at least one of the following: a selection of a numerical model, coefficients of a numerical model, or a set of features to be used in a numerical model.

17. The method of claim 13, wherein at least one contaminant exposure is determined using a statistical or machine learning model applied to values of a contaminant determined from at least one of: the database, a web API, a NWP model, a measurement.

18. The method of claim 13, wherein at least one contaminant exposure is determined using a statistical or machine learning model arranged to compensate for bias or spatial or temporal uncertainty in values of a contaminant determined from at least one of: the database, a web API, a NWP model, a measurement.

19. The method of claim 13, wherein a measure of spatial or temporal uncertainty is determined using a statistical or machine learning model arranged to receive values of a contaminant determined from at least one of: the database, a web API, a NWP model, a measurement.

20. The method of claim 13, wherein the measure of contaminant exposure used to estimate the aircraft contamination is trained using the historical data sets and machine learning, and used thereafter for providing the recommendations.

\* \* \* \* \*